United States Patent
Grossmann et al.

(10) Patent No.: US 12,425,167 B2
(45) Date of Patent: Sep. 23, 2025

(54) METHODS AND APPARATUSES FOR ENHANCED CSI REPORTING WITH RESPECT TO MULTIPLE DOWNLINK

(71) Applicant: KONINKLIJKE PHILIPS N.V., Eindhoven (NL)

(72) Inventors: Marcus Grossmann, Erlangen (DE); Markus Landmann, Erlangen (DE); Sutharshun Varatharaajan, Erlangen (DE)

(*) Notice: Subject to any disclaimer, the term of this patent is extended or adjusted under 35 U.S.C. 154(b) by 470 days.

(21) Appl. No.: 17/927,522

(22) PCT Filed: Jun. 14, 2021

(86) PCT No.: PCT/EP2021/065940
§ 371 (c)(1),
(2) Date: Nov. 23, 2022

(87) PCT Pub. No.: WO2021/254954
PCT Pub. Date: Dec. 23, 2021

(65) Prior Publication Data
US 2023/0246785 A1 Aug. 3, 2023

(30) Foreign Application Priority Data
Jun. 15, 2020 (EP) .................................... 20180067

(51) Int. Cl.
*H04L 5/00* (2006.01)
(52) U.S. Cl.
CPC .................. *H04L 5/0053* (2013.01)
(58) Field of Classification Search
CPC .................................................. H04L 5/0053
See application file for complete search history.

(56) References Cited

U.S. PATENT DOCUMENTS

| 10,812,164 B2 | 10/2020 | Park et al. |
| 2013/0258954 A1* | 10/2013 | Khoshnevis .......... H04L 1/0027 370/329 |

(Continued)

FOREIGN PATENT DOCUMENTS

| WO | WO 2020034857 A1 | 2/2020 |
| WO | WO2020056708 A1 | 3/2020 |

OTHER PUBLICATIONS

3rd Generation Partnership Project; Technical Specification Group Radio Access Network; NR; Radio Resource Control (RRC) protocol specification (Release 16), vol. RAN WG2, No. V16.0.0 Apr. 6, 2020 (Apr. 6, 2020), pp. 1-835.

(Continued)

*Primary Examiner* — Brenda H Pham

(57) ABSTRACT

The embodiment of the present disclosure relates to methods and apparatuses for enhancing the reporting of the channel state information (CSI) with respect to multiple downlink resources. A method performed by a UE comprises: receiving, from a network node, a CSI report configuration which provides a number N of reference signal resources for channel measurement; performing measurements on said N RS resources; calculating or determining one or more CSI quantities for a number M of selected RS resources; and transmitting, to the network node, a CSI report including the calculated or determined CSI quantities, wherein the CSI report comprises two parts—part 1 and part 2—, and wherein the content contained in part 1 indicates the size of part 2. There is also disclosed a UE, a method performed in a network node and a network node.

15 Claims, 7 Drawing Sheets

(56) References Cited

U.S. PATENT DOCUMENTS

2016/0105817 A1* 4/2016 Frenne ................ H04L 1/0026
370/252
2016/0142189 A1* 5/2016 Shin .................... H04B 7/0626
370/329

OTHER PUBLICATIONS

3GPP TSG RAN, "NR; Physical layer procedures for data (Release 16)", 3GPP TS 38.214 V16.1.0 (Mar. 2020), Internet<URL:https://www.3gpp.org/ftp//Specs/archive/38_series/38214/38214-g10.zip>, Apr. 3, 2020.
International Search Report and the Written Opinion of the International Searching Authority, or the Declaration, International Application No. PCT/EP2021/065940, Sep. 20, 2021, European Patent Office.
International Preliminary Report on Patentability, International Application No. PCT/EP2021/065940, Sep. 13, 2022, European Patent Application.
3GPP TS 38.214 v15.4.0, Dec. 2018, 3rd Generation Partnership Project; Technical Specification Group Radio Access Networ; NR; Physical Layer Procedures for Data (Release 15).

\* cited by examiner

```
ControlResourceSet ::=          SEQUENCE {
    controlResourceSetId            ControlResourceSetId, frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)     OPTIONAL -- Need S
        },
        nonInterleaved                  NULL
    },
    precoderGranularity             ENUMERATED {sameAsREG-bundle, allContiguousRBs},
    tci-StatesPDCCH-ToAddList        SEQUENCE(SIZE (1..maxNrofTCI-StatesPDCCH)) OF TCI-StateId OPTIONAL,  -- Cond NotSIB1-initialBWP
    tci-StatesPDCCH-ToReleaseList    SEQUENCE(SIZE (1..maxNrofTCI-StatesPDCCH)) OF TCI-StateId OPTIONAL,  -- Cond NotSIB1-initialBWP
    tci-PresentInDCI                 ENUMERATED {enabled}                                    OPTIONAL,    -- Need S
    pdcch-DMRS-ScramblingID          INTEGER (0..65535)                                      OPTIONAL,    -- Need S
    ...
}
```

Figure 2: Higher configuration of a CORESET (SoTA [6])

```
TCI-State ::=              SEQUENCE {
    tci-StateId                TCI-StateId,
    qcl-Type1                  QCL-Info,
    qcl-Type2                  QCL-Info                    OPTIONAL,      -- Need R
    ...
}

QCL-Info ::=               SEQUENCE {
    cell                       ServCellIndex                               OPTIONAL,      -- Need R
    bwp-Id                     BWP-Id                       OPTIONAL,  -- Cond CSI-RS-Indicated
    referenceSignal            CHOICE {
        csi-rs                     NZP-CSI-RS-ResourceId,
        ssb                        SSB-Index
    },
    qcl-Type                   ENUMERATED {typeA, typeB, typeC, typeD},
    ...
}
```

Figure 3: RRC configuration of the TCI-state information element (SoTA [6])

METHODS AND APPARATUSES FOR ENHANCED CSI REPORTING WITH RESPECT TO MULTIPLE DOWNLINK

CROSS-REFERENCE TO RELATED APPLICATION

This application is a national stage application, filed under 35 U.S.C. § 371, of International Patent Application No. PCT/EP2021/065940 filed on Jun. 14, 2021, and European Patent Application EP20180067.9 filed on Jun. 15, 2020, which are incorporated by reference herein in their entirety.

TECHNICAL FIELD

The present disclosure relates to the field of wireless communications, and in particular to methods and apparatuses for enhancing the reporting of the channel state information (CSI) with respect to multiple downlink resources in a wireless communications network such as advanced 5G networks.

BACKGROUND

The fifth generation (5G) mobile communications system also known as new radio (NR) provides a higher level of performance than the previous generations of mobile communications system. 5G mobile communications has been driven by the need to provide ubiquitous connectivity for applications as diverse automotive communication, remote control with feedback, video downloads, as well as data applications for Internet-of-Things (IoT) devices, machine type communication (MTC) devices, etc. 5G wireless technology brings several main benefits, such as faster speed, shorter delays, and increased connectivity. The third generation partnership project (3GPP) provides the complete system specification for the 5G network architecture, which includes at least a radio access network (RAN), core transport networks (CN) and service capabilities.

FIG. 1 illustrates a simplified schematic view of an example of a wireless communications network 100 including a core network (CN) 110 and a radio access network (RAN) 120. The RAN 120 is shown including a plurality of network nodes or radio base stations, which in 5G are called gNBs. Three radio base stations are depicted gNB1, gNB2 and gNB3. Each gNB serves an area called a coverage area or a cell. FIG. 1 illustrates 3 cells 121, 122 and 123, each served by its own gNB, gNB1, gNB2 and gNB3 respectively. It should be mentioned that the network 100 may include any number of cells and gNBs. The radio base stations, or network nodes serve users within a cell. In 4G or LTE, a radio base station is called an eNB, in 3G or UMTS, a radio base station is called an eNodeB, and BS in other radio access technologies. A user or a user equipment (UE) may be a wireless or a mobile terminal device or a stationary communication device. A mobile terminal device or a UE may also be an IoT device, an MTC device, etc. IoT devices may include wireless sensors, software, actuators, and computer devices. They can be imbedded into mobile devices, motor vehicle, industrial equipment, environmental sensors, medical devices, aerial vehicles and more, as well as network connectivity that enables these devices to collect and exchange data across an existing network infrastructure.

Referring back to FIG. 1, each cell is shown including UEs and IoT devices. gNB1 in cell 121 serves UE1 121A, UE2 121B and IoT device 121C. Similarly, gNB2 in cell 121 serves UE3 122A, UE4 122B and IoT device 122C, and gNB3 in cell 123 serves UE5 123A, UE6 123B and IoT device 123C. The network 100 may include any number of UEs and IoT devices or any other types of devices. The devices communicate with the serving gNB(s) in the uplink and the gNB(s) communicate with the devices in the downlink. The respective base station gNB1 to gNB3 may be connected to the CN 120, e.g. via the S1 interface, via respective backhaul links 111, 121D, 122D, 123D, which are schematically depicted in FIG. 1 by the arrows pointing to "core". The core network 120 may be connected to one or more external networks, such as the Internet. The gNBs may be connected to each other via the S1 interface or the X2 interface or the XN interface in 5G, via respective interface links 121E, 122E and 123E, which is depicted in the figure by the arrows pointing to gNBs.

For data transmission a physical resource grid may be used. The physical resource grid may comprise a set of resource elements (REs) to which various physical channels and physical signals are mapped. For example, the physical channels may include the physical downlink, uplink and/or sidelink (SL) shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random access channel (PRACH or RACH) used by UEs for accessing the network once a UE is synchronized and obtains the MIB and SIB. The physical signals may comprise reference signals (RS), synchronization signals (SSs) and the like. The resource grid may comprise a frame or radio frame having a certain duration, like 10 milliseconds, in the time domain and having a given bandwidth in the frequency domain. The radio frame may have a certain number of subframes of a predefined length, e.g., 2 subframes with a length of 1 millisecond. Each subframe may include two slots of a number of OFDM symbols depending on the cyclic prefix (CP) length. IN 5G, each slot consists of 14 OFDM symbols or 12 OFDM symbols based on normal CP and extended CP respectively. A frame may also consist of a smaller number of OFDM symbols, e.g. when utilizing shortened transmission time intervals (TTIs) or a mini-slot/non-slot-based frame structure comprising just a few OFDM symbols. Slot aggregation is supported in 5G NR and hence data transmission can be scheduled to span one or multiple slots. Slot format indication informs a UE whether an OFDM symbol is downlink, uplink or flexible.

The wireless communication network system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

The wireless communications network system depicted in FIG. 1 may by a heterogeneous network having two distinct overlaid networks, a network of macro cells with each macro cell including a macro base station, like base station gNB1 to gNB3, and a network of small cell base stations (not shown in FIG. 1), like femto- or pico-base stations. In addition to the above described wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, standard.

In 3GPP NR i.e. 5G, and its further releases [1-6], downlink (DL) channel state information (CSI) reporting by a UE to a network node (for e.g., a gNodeB, gNB) aids the scheduling of the physical downlink shared channel (PDSCH). Downlink reference signals (RSs) such as the channel state information reference signal (CSI-RS) and the synchronization signal/physical broadcast channel (SS/PBCH) block (SSB), which can be referred to as CSI resources, are used to evaluate the link between the UE and the network node, and the UE provides CSI feedback to the network node on the physical uplink control channel (PUCCH) or the physical uplink shared channel (PUSCH), wherein the CSI is obtained from measurements of the reference signals.

In millimeter wave (mmWave) frequencies (frequency range 2 (FR2)), i.e., frequencies above 6 GHz, in general, wireless communication between communication devices is performed with spatially selective/directive transmissions and receptions called beams. The term 'beam' is used in the following to denote a spatially selective/directive transmission of an outgoing signal or reception of an incoming signal which is achieved by precoding/filtering the signal at the antenna ports of the device with a set of coefficients. The word precoding or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

The term 'higher layer' in the following, when used in isolation, denotes any communication layer above the physical layer in the protocol stack.

In this disclosure, the term 'frequency bands' may be used to denote any set of frequency domain resources. It may not necessarily denote a frequency band around a specific carrier frequency as defined in the specifications.

The term serving cell and carrier component (CC) may be used interchangeably in this disclosure as a serving cell configured for a UE and is usually a separate physical carrier with a certain carrier frequency. Depending on the frequency of a component carrier/serving cell, the size of the cell and the beamformed reference signals may vary. Each serving cell or component carrier comprises $N_{BWP} \geq 1$ bandwidth parts (BWP) which is a set of frequency domain resources. At any given time instant in a serving cell, the UE may receive physical layer transmissions from a TRP or any other network element in at least one of the configured BWPs in the DL in the cell and may perform transmissions in at least one of the configured BWPs in the UL in the cell.

In the following, the state of the art (SoTA) on CSI reporting and CSI resource configuration is provided. The issues to be considered in multi-TRP/panel or multi-band communications and the necessary enhancements are provided thereafter.

It is to be noted that any mention of an action performed by a gNodeB (gNB) can also be performed by any other element of the network and hence any concerned statement shall be read as such.

It is also to be noted that the aspects and the discussions herein concerning multiple transmit-receive-points (TRPs) in the disclosure also apply to the scenarios where multiple panels from one or more base stations (gNBs/TRPs) are involved instead of multiple TRPs.

Below is described the prior art with respect to the physical downlink control and shared channels, CSI reporting and transmission configuration indication in the downlink (DL).

Physical Layer Downlink Shared and Control Channels

The physical downlink control channel (PDCCH) and the physical downlink shared channel (PDSCH) carry the DL control information and DL data, respectively, to a UE [1-6]. The PDCCH is configured at the radio resource control (RRC) layer level by a base station or a network node or gNodeB (gNB). The gNB transmits the PDCCH(s) on one or more control resource sets (CORESETs) that are configured at RRC level as shown in FIG. 2. A CORESET is a set of resources where control information may be transmitted to the UE. A CORESET comprises of $N_{RB}^{CORESET}$ resource blocks (RBs) in the frequency domain (given by the higher layer parameter frequencyDomainResources) and $N_{symb}^{CORESET} \in \{1, 2, 3\}$ symbols in the time domain (given by the higher layer parameter duration). The UE may be configured with up to 3 CORESETs per BWP per serving cell [1]. PDCCH(s) carrying a downlink control information (DCI) for one of the following purposes may be transmitted on the CORESETs:

scheduling of the PDSCH or the PUSCH or NR/LTE sidelink channel, or
 slot format indication, or
 power control command transmission, or
 cancelling of UL transmission, or
 power saving information notification, or
 soft resources availability notification, among others.

Depending on the purpose of the DCI, the DCI may have various formats. For example, the information for the scheduling of the PDSCH is provided via a DCI with format 1_0 or 1_1 to the UE. Each DCI format has a specific number of fields in it and each field has a specific size. The size of some of the fields may be determined via the configuration of higher layer parameters. Upon the detection of a valid DCI with a specific format, the UE executes the instructions for which the DCI was intended. For instance, upon the detection of a DCI format 1_0 or 1_1 about the scheduling of a PDSCH, the UE receives and processes the PDSCH according to the settings provided in the DCI.

It should be noted that the terms PDCCH and DCI may be used interchangeably in this disclosure. Both terms refer to a downlink control channel information obtained via the physical layer.

Channel State Information Framework

Channel state information (CSI) is provided by the UE to a network node (or gNB) after the measurement of certain CSI resources in the downlink which may be used for the adaptation of the transmission parameters on the link according to the channel conditions. In the DL, the CSI resources are CSI-RS and SSB resources. These DL RS resources from which the CSI is calculated by the UE are configured by the network node. The UE performs measurements on the DL RS resources according to the instructions provided by the network node or according to the instructions fixed in the specifications and the UE provides CSI quantities the network node has indicated to report in the CSI report. The CSI report may comprise one or more of the following CSI quantities:

CSI-RS resource indicator (CRI)
SSB resource indicator (SSBRI)
Layer 1 (L1), i.e., physical layer—Reference Signal Received Power (RSRP)
Layer 1 (L1), i.e., physical layer—Signal to Interference plus Noise Ratio (SINR)
Precoder Matrix Indicator (PMI)
Rank Indicator (RI)
Channel Quality Indicator (CQI)
Layer Indicator (LI)

The UE is provided via higher layer signaling with $N_{rep} \geq 1$ CSI report configurations/settings (CSI-ReportConfig) and $N_{res} \geq 1$ CSI resource settings (CSI-ResourceConfig). Each CSI resource setting, CSI-ResourceConfig, provides one or more of the following:

Non-zero-power CSI-RS (NZP CSI-RS) resource set(s) comprising one or more NZP CSI-RS resources,
SSB resource set(s) comprising one or more SSB resources,
CSI interference management (CSI-IM) resource set(s) comprising one or more CSI-IM resources.

An NZP or SSB resource or a CSI-IM resource may comprise one or more ports. A CSI-IM resource may also be referred to as zero-power (ZP) CSI-RS resource. The configuration of a CSI-IM resource comprises a pattern of resource elements in a time-frequency grid. These resource elements are transmitted with zero power, and intra- and inter-cell interference and/or noise can be measured by the UE from these resource elements.

For the evaluation of the CSI, the gNB (or network node) provides instructions to the UE or the instructions are fixed in the specifications for measurement of various parameters from the provided resources. The CSI measurement involves the measurement of a channel part and an interference part (the part of the link that interferes with the UE's communication) to evaluate various CSI quantities. The channel and the interference may be measured from different set(s) or group(s) of resources. The interference may be measured from one or more CSI-IM resources, or NZP-CSI-RS resources or SSB resources. The channel part may however be measured only from NZP CSI-RS resources or SSB resources.

The information element that provides the CSI report configuration is shown below. Each CSI report configuration(s) is linked with at least one, and up to three CSI resource settings, where the three CSI resource settings provide the following:

NZP-CSI-RS or SSB resource(s) for channel measurement,
CSI-IM resource(s) for interference measurement, and
NZP-CSI-RS or SSB resource(s) for interference measurement.

```
CSI-RepertConfig ::=                        SEQUENCE {
    reportConfigId                              CSI-ReportConfigId,
    carrier                                     ServCellIndex                OPTIONAL,    -- Need S
    rescurcesForChannelMeasucesent              CSI-BesourceConfigId,
    csi-IM-ResourcesForInterference             CSI-ResourceConfigId         OPTIONAL,    -- Need R
    nzp-CSI-RS-ResourcesForInterference         CSI-ResourceConfigId         OPTIONAL,    -- Need R
    reportConfigIdType                          CHOICE {
       periodic                                    SEQUENCE {
          reportSlotConfig                            CSI-ReportPeriodicityAndOffset,
          pucch-CSI-ResourceList                      SEQUENCE (SIZE (1..maxNrofBWPs)) OF PUCCH-CSI-Rescorce
       },
       semiPersistentOnPUCCH                       SEQUENCE {
          reportSlotConfig                            CSI-ReportPeriodicityAndOffset,
          pucch-CSI-ResourceList                      SEQUENCE (SIZE (1..maxNrofBWPs)) OF PUCCH-CSI-Rescorce
       },
       semiPersistentOnPUCCH                       SEQUENCE {
          reportSlotConfig                            Enumerated {s15, s110, s120, s140, s180, s1160, s1320},
          reportSlotOffsetList                        SEQUENCE (SIZE (1.. maxNrofUL-Allocations)) OF INTEGER(0..32),
          p0alpha                                     p0-PUSCH-AlphaSetId
       },
       aperiodic                                   SEQUENCE {
          repertSlotOffsetList                        SEQUENCE (SIZE (1..maxNrofUL-Allocations)) OF INTEGER(0..32),
       }
    },
    reportQuantity                              CHOICE {
       none                                        NULL,
       cri-RI-PMI-CQI                              NULL,
       cri-RI-i1                                   NULL,
       cri-RI-i1-CQI                               SEQUENCE {
          pdsch-BundleSizeForCSI                      Enumerated {n2, n4}   OPTIONAL    -- Need S
       },
       cri-RI-CQI                                  NULL,
       cri-RSRP                                    NULL,
       ssb-Index-RSRP                              NULL,
       cri-RI-LI-PMI-CQI                           NULL
    },
    reportFreqConfiguration                     SEQUENCE {
       ...,
    }                                                                        OPTIONAL,    -- Need R|
    timeRestrictionForChannelMeasurements       ENUMERATED {configured, notConfigured},
    timeRestrictionForInterferenceMeasurements  ENUMERATED {configured, notConfigured},
```

```
    ...,
    reportQuantity-r16                  CHOICE {
        cri-SINR-r16                        NULL,
        ssb-Index-SINR-r16                  NULL
    }                                                           OPTIONAL,    -- Need R
    ...,
}
```

Higher layer configuration of a CSI report. Positions with "..." denote parameters left out from the configuration to display the parameters necessary for illustrations and discussions.

Reporting Configurations

The UE calculates the various CSI parameters or quantities indicated by the gNB for a CSI report as provided in the higher layer parameter 'reportQuantity' or 'reportQuantity-r16' in the report configuration. The parameters are dependent on each other, and the calculation of a parameter may be conditioned on another parameter [4]:

- LI shall be calculated conditioned on the reported CQI, PMI, RI and CRI
- CQI shall be calculated conditioned on the reported PMI, RI and CRI
- PMI shall be calculated conditioned on the reported RI and CRI
- RI shall be calculated conditioned on the reported CRI.

The CRI or SSBRI is the resource with respect to which the channel is measured and the precoder (PMI), rank (RI) and the corresponding CQI (an indication of a 'suitable MCS' (modulation and coding scheme) according to the specifications) provide the link parameters with respect to this resource.

As observed in the configuration of the CSI report, at least the following aspects of the CSI report are configurable by the gNB:

- The CSI quantities to be reported by the UE,
- The frequency granularity with which one or more of the CSI quantities are reported,
- The time-domain behavior (aperiodic, semi-persistent and periodic) of the report,
- The time-domain restriction for channel and interference measurement obtained for the report.

Depending on the time-domain behavior of the report, the triggering, and the channel on which the report is transmitted may vary. The following table (Table 1) from TS 38.214 [4] provides an overview of the various time-domain behaviors supported by the 3GPP 5G NR specifications for CSI reporting and the associated CSI resources, the type of triggering or activation for the report and the channels in the uplink used for the reporting. The medium access control (MAC) layer or the physical layer may be used for the triggering or activation, and if applicable, deactivation of the CSI reporting. The gNB transmits medium access control—control element (MAC-CE) messages in the case of semi-persistent CSI reporting for the activation or deactivation of the CSI report. The physical layer is used in the case of semi-persistent or aperiodic CSI reporting for the triggering and deactivation, if applicable.

TABLE 1

Triggering and activation of CSI report for various time-domain behaviors [4]

| CSI-RS Configuration | Periodic CSI Reporting (reported on PUCCH) | Semi-Persistent CSI Reporting (reported on PUCCH or PUSCH) | Aperiodic CSI Reporting (reported on PUSCH) |
|---|---|---|---|
| Periodic CSI-RS | No dynamic triggering/activation | For reporting on PUCCH, the UE receives an activation command via a MAC-CE message, as described in [5, TS 38.321]; for reporting on PUSCH, the UE receives triggering on DCI | Triggered by DCI |
| Semi-Persistent CSI-RS | Not Supported | For reporting on PUCCH, the UE receives an activation command via a MAC-CE message, as described in [5, TS 38.321]; for reporting on PUSCH, the UE receives triggering on DCI | |
| Aperiodic CSI-RS | | Not Supported | |

Downlink Transmission Configuration Indication

As previously described, the PDCCH and the PDSCH carry the DL control information and DL data, respectively, to a UE [1-6].

Demodulation reference signals (DMRS) are embedded for the coherent demodulation of the PDCCH/PDSCH at the UE. The DMRS consists of a set of DMRS ports. The number of DMRS ports determines the number of transmission layers contained in a PDSCH. DMRS is used for channel estimation at the UE to coherently demodulate the PDSCH or PDCCH(s). In the case of PDCCH, one or more of them may be transmitted on a CORESET. Therefore, the DMRS for the coherent demodulation of the PDCCH(s) on the CORESET may be embedded across the PDCCH(s) transmitted on the CORESET.

A parameter in the transmission of the PDCCH and the PDSCH is known as the 'Transmission Configuration Indication'—state (TCI-state) [4]. In 3GPP Rel. 16, the indication of how the control or the shared channel is transmitted by the gNB and what assumptions the UE must consider while receiving them, is done via reference signals (RSs). The indication to the UE is performed using a TCI-state information element (IE) configured via RRC, as illustrated in FIG. 3. A TCI-state IE, among others, comprises the following elements:

- One of more reference signal(s), and for each reference signal, one or more quasi-colocation (QCL) assumptions.

The TCI-state is used to mention how to receive a PDSCH or the PDCCH(s) transmitted on a CORESET. Applying a TCI-state to a PDSCH or CORESET implies that the PDSCH or the PDCCH(s), transmitted on the CORESET, shall be assumed to be quasi-co-located with the reference signals mentioned in the TCI-state.

Assuming 'quasi-colocation' means that certain channel parameters such as Doppler shift/spread, delay spread, average delay and/or Tx beam direction are assumed to be the same for the RS mentioned in the TCI-state and the PDSCH, or the PDCCH(s) transmitted on the CORESET. Four different QCL types can be indicated in 3GPP Rel. 16 [4]:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

One or more of the QCL-Info parameter(s) is/are included in the TCI-state IE to provide the QCL assumption(s) associated with the TCI-state.

For example, a TCI-state IE comprising a DL reference signal (RS) 'A' with QCL assumption 'QCL-typeA' and a DL RS 'B' with QCL-assumption 'QCL-TypeD' is considered. Applying this TCI-state to a PDSCH or CORESET with the given quasi-colocation assumptions means that the UE may assume the same Doppler shift, Doppler spread, average delay and delay spread for the PDSCH or the PDCCH(s) transmitted on the CORESET and DL RS 'A', and the UE may use the same spatial filter to receive the DL RS 'B' and the PDSCH or the PDCCH(s) transmitted on the CORESET, or the Rx spatial filter to receive the PDCCH(s) on the CORESET or the PDSCH may be obtained from or be similar to that used for the reception of the DL RS 'B'.

Usually, the TCI state that is used for a PDCCH or a PDSCH contains the identifiers (IDs) of channel state information reference signals (CSI-RS) or synchronization signal blocks (SSB) along with the QCL assumptions for the reference signal. The RS in the TCI-state is usually a RS that the UE has measured before, so that it can use it as a reference to receive the DMRS of the PDCCH or PDSCH, and hence demodulate the same. The indication of a TCI-state for a CORESET or a PDSCH is performed via MAC-CE messages or using the TCI-indication field in the downlink control information (DCI) used to schedule the PDSCH.

In FR2, where the gNB and UE establish a connection via spatially selective/directive beams, the TCI-state is used to indicate the Rx beams in which the UE may receive, i.e., the spatial filter that may be used by the UE to receive a PDSCH/PDCCH(s) via a 'qcl-TypeD' assumption with a CSI-RS or an SSB that the UE has received. The determination of the DL Tx beam to transmit PDCCH(s)/PDSCH is performed via a beam sweeping procedure by the network node (e.g., the gNB). In a beam sweeping procedure, the gNB configures a set of DL RSs (CSI-RS or SSB) via RRC for the UE to measure the set of DL RSs. Each of the configured DL RS may be transmitted with a different spatial filter, i.e., each of the configured DL RS may be transmitted in a different direction by the gNB. The UE measures each of the configured DL RS by receiving them using one or more spatial filters—the RSs may all be received with the same spatial filter, or a different spatial filter may be used to receive each RS. Following the measurements, the UE sends a beam report to the gNB. The beam report comprises the indices of $1 \leq L \leq 4$ configured DL RSs (essentially, L DL Tx beam directions, with each beam direction resulting from the use of a specific spatial filter at the gNB) along with the received power in each of the RSs [4]. With the help of the beam report, the gNB determines one or more suitable DL Tx beam direction(s), i.e., spatial filter(s) for the transmission of the PDCCH(s) and the PDSCH.

Multi-Trp Scenarios

In 3GPP Rel. 16, multi-TRP transmissions that improve the reliability and robustness of PDSCH transmission(s) were standardized. A network node (or gNB) may be viewed as a TRP. Two types of multi-TRP transmissions of PDSCH are possible:

Single DCI based multi-TRP: A single DCI schedules transmission of PDSCH(s) from more than one TRP—the PDSCH(s) may be multiplexed in space, time and/or frequency domains. When the PDSCH(s) are multiplexed to the UE in space, time and/or frequency domains from different TRPs, the TCI-field in the DCI may indicate more than one TCI-state to indicate the QCL assumptions for the reception of multiple parts of a single PDSCH or multiple PDSCHs. The TCI-field in the PDSCH-scheduling DCI in 3GPP Rel. 15, which supports only single-TRP transmissions from a single DCI, indicates only one TCI-state for the scheduling of a PDSCH. The TCI-field is of size b bits and can indicate up to $2^b$ different TCI-states. A higher layer, however, may configure $T \geq 2^b$ TCI-states. For the purpose of indication via the TCI-field for the PDSCH, the UE may receive a MAC-CE message that down-selects $2^b$ TCI-states from the T TCI-states configured via a higher layer so that each codepoint of the TCI-field maps to a TCI-state. To support single-DCI based multi-TRP transmissions, in 3GPP Rel. 16, a MAC-CE message providing a mapping of one or more higher-layer-configured TCI-states with a codepoint of the TCI-field to the UE, has been introduced.

Multi-DCI based multi-TRP: In this scenario, at a given time instant, the UE may receive multiple PDSCHs, each scheduled by a different DCI. The CORESETpoolIndex is a parameter introduced in 3GPP Rel. 16 [4] in the configuration of a CORESET that may be used in this scenario. This parameter or index may be used to group CORESETs into different pools according to the TRPs they are associated with in the case of multi-TRP transmissions. The PDCCHs transmitted on the CORESETs configured with the same CORESETpoolIndex value may be considered to be associated with the same TRP. A CORESET belonging or associated to a CORESETpoolIndex means that the higher layer configuration of the CORESET may comprise said CORESETpoolIndex (value). When a UE is configured, by the network node, with multiple CORESETpoolIndex values, the UE understands that it may receive multiple PDSCHs, possibly overlapped in time and frequency domains, scheduled by multiple PDCCHs that are received on CORESETs configured with different CORESETpoolIndex values, i.e., CORESETs associated with different TRPs.

Link adaptation for multi-frequency band, multi-beam and/or multi-TRP/panel downlink-based transmissions requires knowledge of the CSI at the serving gNB from the UE with respect to each frequency band, beam and/or TRP. The CSI knowledge facilitates dynamic scheduling of the transmissions to adapt to the evolving channel conditions between the UE and the one or more TRP(s)/panel(s) over one or more frequency band(s) or beam(s). This enables a network node, or gNB, to switch transmissions "on" or "off", or to adapt the transmission parameters of the link(s)

(for e.g., the modulation and coding scheme/rate—MCS, number of layers, precoding, etc.) with respect to each frequency band, beam and/or TRP(s). In the state of the art, various CSI quantities such as PMI, RI, CQI, etc. may be reported with respect to only one resource from a given set of resources. The UE cannot report CSI with respect to multiple resource(s) that it may associate with. To enable dynamic multi-frequency band, multi-beam and/or multi-TRP/panel-based downlink transmissions, the UE may provide CSI with respect to one or more resource(s) to one or more network node(s). Such a CSI report may contain the following information:

Selected TRP(s), panel(s), beam(s) and/or frequency band (s) suitable for downlink transmission(s) (this information may be indirectly conveyed by the reporting of associated resource(s)), Transmission parameters with respect to the selected TRP(s), beam(s), panel(s) and/or frequency band(s).

The TRPs, panel(s), beam(s) and/or frequency bands selected by the UE for the transmission may depend on the following aspects:

the capability of the UE to receive transmissions on multiple frequency bands or from multiple TRPs/panels/beams, quality of service (QoS) or data rate requirement(s) for the UE, and power saving conditions, e.g., the UE may determine that it may need to consume less power, and hence it selects a reduced number of frequency band(s) and/or TRP(s)/panel(s)/beam(s) for communications.

Therefore, the evaluation and reporting of channel conditions by the UE with respect to multiple TRPs, panels, beams and/or frequency bands may enhance the scheduling of resources by the gNB.

It is noted that the information in the above section is only for enhancing the understanding of the background of the invention and therefore it may contain information that does not form prior art that is already known to a person of ordinary skill in the art.

In the further parts of the disclosure, methods regarding the configuration of the CSI report and the associated resources required for channel and interference measurements by the UE are provided.

In the following, are provided methods and apparatuses for enhancing the reporting of the CSI with respect to multiple downlink resources in a wireless communications network such as advanced 5G networks.

SUMMARY

As mentioned above, it is an objective of the embodiments herein to provide methods and apparatuses for enhancing the reporting of the CSI.

According to an aspect of some embodiments herein, there is provided a method performed by a UE, the method comprising: receiving, from a network node, a CSI report configuration which provides a number N of reference signal (RS) resources for channel measurement, via one or more CSI setting(s); performing measurements on said N RS resources; calculating or determining one or more CSI quantities for a number M of selected RS resources; and transmitting, to the network node, a CSI report including the calculated or determined CSI quantities, wherein the CSI report comprises two parts, —part 1 and part 2—, and wherein the content contained in part 1 indicates the size of part 2.

According to another aspect of embodiments herein, there is provided a UE comprising a processor and a memory containing instructions executable by the processor, whereby said UE is operative or configured to perform any one of the embodiments presented in the detailed description related to the actions performed by the UE.

According to an aspect of some embodiments herein, there is provided a method performed by a network node or gNB, the method comprising: transmitting, to a UE, a CSI report configuration which provides a number N of RS resources for channel measurement, via one or more CSI setting(s), for enabling the UE to perform measurements on said N RS resources and calculate or determine one or more CSI quantities for a number M of selected RS resources; receiving, from the UE a CSI report including the calculated or determined CSI quantities, wherein the CSI report comprises two parts, —part 1 and part 2—, and wherein the content contained in part 1 indicates the size of part 2; and decoding part 1 of the CSI report for determining the payload size of part 2 of the CSI report, allowing said network node to decode the CSI report.

According to another aspect of embodiments herein, there is provided a network node comprising a processor and a memory containing instructions executable by the processor, whereby said network node is operative or is configured to perform any one of the embodiments presented in the detailed description related to the actions performed by the network node.

There is also provided a computer program comprising instructions which when executed on at least one processor of the UE, cause the at least said one processor to carry out the actions or method steps presented herein.

There is also provided a computer program comprising instructions which when executed on at least one processor of the network node, cause the at least said one processor to carry out the method steps presented herein.

A carrier is also provided containing the computer program, wherein the carrier is one of a computer readable storage medium; an electronic signal, optical signal, or a radio signal.

An advantage of embodiments herein is to enhance the reporting of the CSI. Additional advantages of the embodiments herein are provided in the detailed description of this disclosure.

BRIEF DESCRIPTION OF THE DRAWINGS

FIG. 2 depicts a higher layer configuration of a CORE-SET (state of the art (SoTA)

FIG. 3 illustrates the RRC configuration of the TCI-state information element (SoTA)

DETAILED DESCRIPTION

Figure 1:
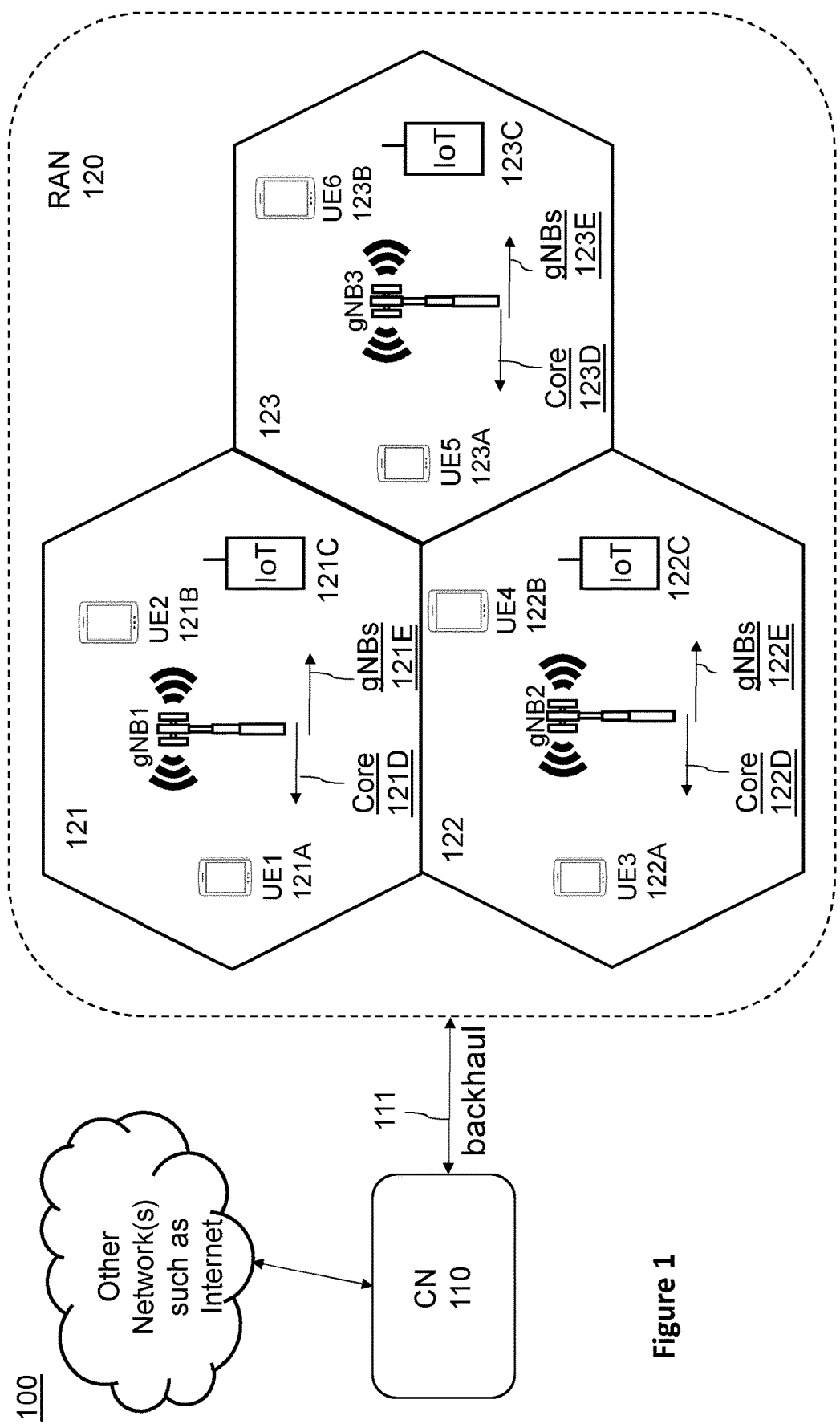
FIG. 1 depicts a simplified view of a wireless communications network including a core network and a radio access network

In the following, a detailed description of the exemplary embodiments is described in conjunction with the drawings, in several scenarios to enable easier understanding of the solution(s) described herein.

In this disclosure, novel methods for CSI reporting and CSI resource configuration are provided for scenarios where the DL channel is provided over multiple frequency bands or bandwidth parts (BWPs) from a network node (or gNB) or from multiple transmit-receive-points (TRPs) or panels from one or more TRP(s) or beams at a given time instance in one or more cells. With the proposed CSI reporting and CSI resource configuration methods, the network node is able to schedule multiple frequency bands/BWPs and/or TRPs/panels/beams for downlink transmissions dynamically; it may switch "on" or "off" the link associated with a certain frequency band/BWP or a TRP/beam and the UE in the DL and also adapt the link associated with a certain frequency band/BWP or TRP/beam and the UE based on the CSI reported by the UE.

Further, some embodiments herein relate to a method for measurement of reference signals and reporting of the CSI for a provided CSI report configuration information.

Throughout the present disclosure, a CSI-RS resource refers to a non-zero power (NZP) CSI-RS resource, unless stated otherwise. Further, throughout the present disclosure, a CSI-IM resource refers to a zero power (ZP) CSI-RS resource, unless stated otherwise. A CSI resource may denote an SSB or CSI-RS resource with respect to which one or more CSI quantities may be provided or evaluated or reported.

According to an embodiment, a method performed by a UE, the method comprising:
  receiving from a network node (or gNB) a CSI report configuration providing a number of N reference signal (RS) resources for channel measurement via one or more CSI resource setting(s), wherein the N reference signal resources may be CSI-RS or SSB resources, or a mixture of CSI-RS and SSB resources,
  performing measurements on the N reference signal resources provided for channel measurement in the CSI report configuration,
  calculating or determining one or more CSI quantities for M selected reference signal resources, and
  transmitting to the network node a CSI report including the calculated CSI quantities for the M selected resources, wherein the CSI report comprises two parts, part 1 and part 2, and wherein the content contained in part 1 indicates the size or payload size of part 2 of the CSI report.

According to an exemplary embodiment, the CSI report may be comprised of P parts, wherein part 1 (i.e. the first part) has a fixed payload size and the size(s) of the part(s) p, $1<p \le P$, is/are indicated or determined by the content of part q, $1 \le q<p$, wherein P may be smaller or equal to M, and M may be smaller than or equal to N and M may be greater than or equal to 1.

In accordance with an embodiment, the aforementioned CSI report includes at least one of following the CSI quantities:
  a channel resource identifier or a CSI-RS resource indicator (CRI) indicating a subset or a combination of CSI-RS resources (out of the CSI-RS resources provided in the CSI report configuration),
  an SSB resource identifier (SSBRI) indicating a subset or a combination of SSB resources (out of the SSB resources provided in the CSI report configuration),
  a rank indicator (RI) associated with a resource indicating a rank value for the CSI resource or an RI indicating a combination of rank values for the subset of CSI-RS resources (e.g., indicated by the CRI) in the CSI report,
  a channel quality indicator (CQI) indicating one or more CQI value(s) for the subset of CSI-RS resources (e.g., the resource(s) indicated by the CRI or SSBRI),
  a layer indicator (LI) value, and
  a precoding matrix indicator (PMI) indicating one or more precoding matrices for the subset of CSI-RS resources (e.g., indicated by the CRI).

In accordance with an embodiment, the CSI report includes the one or more CSI quantities wherein each CSI quantity is associated with at least one of the M selected reference signal resources. The M selected reference signal resources are indicated in the CSI report.

As previously described, the CSI report contains at least one of the following CSI report quantities with respect to each of the M resources associated with the CSI report, if indicated as a report quantity in the CSI report configuration: RI, PMI, CQI, and LI. For example, if the CSI report configuration indicates 'RI/PMI/CQI', then the UE reports the three quantities with respect to each of the M CSI-RS and/or SSB resources associated with the CSI report.

The reason for segmenting the CSI report into at least two parts is that the CSI (i.e., the reported CSI quantity/quantities) in the CSI report may be associated with a subset or combination of M resources out of the configured N resources for channel measurement, wherein the subset of M resources and the value of M may be freely selected by the UE. As the payload size of the CSI report depends on the selected value of M, which is unknown to the network node, it is beneficial to segment the CSI report into P parts, wherein the first part, part 1, has a fixed payload size which is known to the network node. In a first option, each part p ($1 \le p<P$) may indicate the size of part p+1. In a second option, part 1 indicates the size(s) of all part(s) p ($1<p \le P$). Here, it is assumed that the value of M is smaller or equal to N, and P is smaller or equal to M. As a special case, when M is larger or equal to two, the CSI report comprises P parts, wherein P=2. Therefore, after receiving the CSI report by the network node and decoding part 1 of the CSI report, the payload size for the following part or the remaining part(s) of the CSI report may be derived which allows the network node to decode the full CSI report.

For example, and as previously described, the CSI report provided by the UE, to the network node, comprises two parts—part 1 and part 2—and the content contained in part 1 indicates the size of part 2. After decoding of part 1 of the CSI report, the gNB knows the size of part 2 of the CSI report. In another example, the CSI report is comprised of 3 parts, part 1, part 2 and part 3. Part 1 indicates the size of part 2, and part 2 indicates the size of part 3. After decoding of part 1 (which has a fixed size), the gNB knows the size of part 2 and can decode part 2. After decoding part 2, the gNB knows the size of part 3 and can decode part 3.

In some examples, the size of the p-th part of the CSI report may be determined by an indicator (bit field) that is contained in a part q (q<p) of the CSI report. In some examples, the existence of a part of the CSI report is determined by a bitmap or one of the indicator fields in one of the previous parts of the CSI report. The size of a part may be determined by the CSI quantities contained in the CSI report. If a part is existent, the size is predetermined, and if non-existent, the size is zero. The CSI quantities to be reported may be either provided in the CSI report configuration or they are known to the UE (e.g., they are fixed in the specification).

As an example, part q may comprise an indicator that indicates the size of part p; it may also determine if the part p is existent or not. For e.g., the CRI may determine the resources for which the CSI is reported; if, for example, 2 resources are indicated by the CRI the report may comprise 1 or 2 parts.

The above CSI reporting scheme is beneficial when the UE needs to calculate CSI (i.e., one or more CSI quantities) based on multiple subsets of resources or resource combinations wherein each subset of resources or each resource combination is associated with, for example, a combination of frequency bands or bandwidth part(s) or a combination of beams or TRPs. The UE may determine a subset or a combination of frequency band(s) or bandwidth part(s) for operation or TRP(s)/beam(s) to be used for joint transmission. The above CSI reporting scheme would therefore allow for dynamic frequency band or TRP selection and/or scheduling for joint transmission.

A non-limiting example of a special case would be a CSI report configuration providing two resources that may be associated with two frequency bands or the ports from two different TRPs or two different beams from one or more TRP(s). The CSI may help the scheduler at the gNB to determine if an optimal subset or a combination of association(s) with said frequency band(s) or TRP(s) or beam(s).

In accordance with an embodiment, the CSI report may comprise P parts, wherein the first part contains one or more CSI quantities that is/are associated with a first selected CSI-RS or SSB resource, and the p-th part contains one or more CSI quantities that is/are associated with a p-th selected CSI-RS or SSB resource. In some examples, P=M. As a special case, the CSI report comprises two parts (P=2), wherein the first part contains one or more CSI quantities that is/are associated with a first selected CSI-RS or SSB resource and the second part contains one or more CSI quantities that is/are associated with the remaining (M−1) selected CSI-RS and/or SSB resources. In one alternative, the first part of the CSI report indicates at least R of the M selected CSI-RS or SSB resource(s) that are associated with one or more CSI quantities in the CSI report, wherein 1 R M. The value of R may be indicated to the UE via a higher layer or is fixed in the specification. In another alternative, the (p−1)-th part of the CSI report indicates the CSI-RS and/or SSB resource for one or more CSI quantities of the p-th part of the CSI report (1<p≤P).

As mentioned earlier, the UE is configured with a CSI report configuration providing N resources associated with one or more resource sets configured for channel measurement. The resource can be a CSI-RS or an SSB resource and a resource set can be a CSI-RS or SSB resource set. The UE may be configured to send a CSI report comprising CSI (i.e., one or more CSI quantities) corresponding to M (1≤M≤N) or up to M selected resources to a network node. In some examples, the value of the parameter M is either
  freely chosen by the UE, or
  a priori known to the UE, or
  fixed and known in specification.

In some examples, the value of the parameter M may be indicated to the UE either via physical layer signaling (e.g., via DCI signaling) or via a higher layer signaling (e.g., via RRC or MAC-CE signaling) from the network node.

In some examples, the resources provided in the CSI report configuration may be associated with ports from different TRPs (or gNBs) or beams. When the UE is configured with N resources for channel measurement, the N resources may be associated with N different TRPs or beams.

In some examples, each resource for channel measurement in the CSI report configuration may be associated with partially overlapping or non-overlapping frequency bands or bandwidth parts. This means when the UE is configured with N resources configured for channel measurement, each resource may be associated with a different frequency band or bandwidth part.

CSI Report and Resource Configuration
  CSI Report Configuration
  In accordance with an embodiment, the UE is configured to receive a CSI reporting configuration from a network node via a higher layer (e.g. RRC), the CSI reporting configuration providing:
    N NZP CSI-RS or SSB resources for channel measurement wherein each CSI-RS or SSB resource comprises K≥1 CSI-RS or SSB ports, respectively, and
    one or more CSI quantities that the UE shall report with respect to 1≤M≤N resources configured for channel measurement.

The resources for channel measurement may be provided to the UE via one or more 'CSI-ResourceConfig' information elements configured via a higher layer (e.g, RRC). The CSI-ResourceConfig information element may comprise one or more sets of SSB and/or CSI-RS resources. In addition, the CSI report configuration may include one or more sets of resources for interference measurement. In some examples, the resources for interference measurement are CSI-IM (ZP CSI-RS) resources. In some examples, the resources for interference measurement are NZP CSI-RS or SSB resources. In some examples, the resources for interference measurement are NZP CSI-RS or SSB resources, and in addition, CSI-IM resources.

In accordance with embodiments, the UE may compute the CSI with respect to a resource n, which may be a CSI-RS or SSB resource, as:
  the channel is measured by the UE using one or more reference signal(s), indicated by resource n, provided by one or more network nodes,
  the interference is measured using one or more reference signal(s) indicated by one or more resources, from at least one of the following:
    a CSI-IM resource,
    One or more NZP CSI-RS or SSB resources different to resource n that is/are configured for channel measurement, or
    One or more NZP CSI-RS or SSB resources that are configured for interference measurement.

In some examples, there may exist a correspondence between a resource for channel measurement and a CSI-IM resource. When such a correspondence exists, the interference is measured from the corresponding CSI-IM resource, if applicable.

In some examples, the UE may be provided with N resources for channel measurement. The UE measures the interference corresponding to the n-th resource for channel measurement from one or more of the remaining N−1 resources (resources different to resource n) for channel measurement.

In some examples, the UE may be provided with N resources for channel measurement and one or more CSI-IM resources. The UE measures the interference corresponding to the n-th resource for channel measurement from one of the CSI-IM resources.

In some examples, the UE may be provided with N resources for channel measurement and one or more CSI-IM resources. The UE measures the interference corresponding to the n-th resource for channel measurement from one or more of the remaining N−1 resources (different to resource n) for channel measurement and from one CSI-IM resource.

In some examples, the UE may be provided with N resources for channel measurement and N CSI-IM resources in the CSI report configuration. The UE measures the interference corresponding to the n-th resource for channel measurement from the n-th CSI-IM resource.

There exists a one-to-one correspondence among the N resources for channel measurement and the N CSI-IM resources, wherein each resource for channel measurement may be associated with a distinct CSI-IM resource.

In some examples, the UE may be provided with N resources for channel measurement, N CSI-IM resources and N NZP-CSI-RS resources for interference measurement. The UE measures the interference corresponding to the n-th resource for channel measurement from the n-th CSI-IM resource and the n-th NZP-CSI-RS resource for interference measurement.

The current CSI report configuration used in the NR specification [4], [6] needs to be modified to allow a UE to report CSI with respect to multiple CSI-RS and/or SSB resources, which can be reported in one or multiple parts. For this new type of CSI reporting, the NR CSI report configuration needs to be modified and/or one or more new higher-layer parameter(s) need to be introduced.

In accordance with embodiments, the UE is configured to receive a higher layer configuration, e.g. a CSI report configuration, comprising one or more parameter(s) indicating the reporting of one or more CSI quantities with respect to M or up to M resources. The M resources (CSI-RS or SSB resources, or a mixture of it) are provided as channel measurement resources in the (CSI) report configuration. In some examples, the value of M may be provided or indicated by the parameter providing the reporting quantity in the CSI report configuration or by a different parameter in the CSI report configuration or by a combination of parameters provided via a higher layer. It may also be provided to the UE via a MAC-CE message. At least one of the CSI quantities provided in the CSI report configuration is reported by the UE with respect to two or more associated CSI-RS and/or SSB resources. In one example, if the CSI report configuration indicates the CSI quantities RI, PMI and CQI, then the three CSI quantities are reported by the UE with respect to two or up to M CSI-RS and/or SSB resources. The resources, or resource combinations, or number of resources for which the CSI quantities are provided in the CSI report may be configured via a higher layer, chosen by the UE, or they are known by the UE and fixed in the specification.

CSI Resource Configuration

Channel and interference measurement resources are provided via the higher layer information element CSI-ResourceConfig that provides the CSI resource settings for the CSI report configuration. One or more sets of NZP CSI-RS and/or SSB and/or CSI-IM resources are provided in a CSI-ResourceConfig information element (IE). A CSI report configuration indicates a resource setting (CSI-ResourceConfig) for channel measurement, and if applicable, it indicates one resource setting for interference measurement from CSI-IM resources and/or one resource setting for interference measurement from NZP-CSI-RS or SSB resources. In the following embodiments, methods for the configuration of CSI resource settings for the various purposes of CSI reporting, as described above, are provided.

In accordance with embodiments, the CSI report configuration is linked to one or more CSI resource setting(s), wherein the CSI report configuration provides at least one of the following settings:

One or more CSI resource setting(s), each providing one or more set(s) of DL RS resource(s) for channel measurement, One or more CSI resource setting(s), each providing one or more set(s) of CSI-IM resource(s) for interference measurement, One or more CSI resource setting(s), each providing one or more set(s) of DL RS resource(s) for interference measurement.

In some examples, the number of CSI resource setting(s) for channel measurement and/or the number of CSI resource setting(s) for interference measurement from CSI-IM resources and/or the number of CSI resource setting(s) for interference measurement from CSI-RS or SSB resources is equal to the number of frequency bands or the number of TRPs or beams the resources are associated with. For example, it is equal to the number of CORESET pool index values, or the maximum number of TCI states mapped to a single TCI-field codepoint in the DCI, in a given cell.

In accordance with an embodiment, the UE may measure the interference for a resource m of a CSI resource setting k from One or more resources associated with one or more CSI resource setting(s) k' (k'≠k) for channel measurement, and/or One or more resources associated with one or more CSI resource setting(s) providing one or more CSI-IM resource(s) and/or one or more DL RS resource(s) for interference measurement.

In some examples, the CSI reporting configuration provides one CSI resource setting for channel measurement, and one CSI resource setting for interference measurement comprising CSI-IM resources and one CSI resource setting for interference measurement comprising CSI-RS or SSB resources, and/or one CSI resource setting for interference measurement comprising either CSI-IM resources or CSI-RS or SSB resources The UE may then measure the interference corresponding to the resource m for channel measurement from One or more resources other than resource m associated with the CSI resource setting for channel measurement and/or One or more resources associated with CSI resource setting(s) for interference measurement.

In some cases, there is a non-zero-power CSI-RS or SSB interference resource corresponding to each channel resource. This may be a resource that is associated with an interfering TRP or partially overlapping frequency bands.

In accordance with an embodiment, the UE is provided with a CSI report configuration comprising as many NZP-CSI-RS or SSB resource(s) for interference measurement via one or more resource setting(s) as resource(s) for channel measurement. For example, when 2 resources are provided for channel measurement, there may also be 2 resources (NZP-CSI-RS resources or SSB resources or a mixture of both) provided for interference measurement, wherein each channel measurement resource has a corresponding NZP-CSI-RS or SSB resource interference measurement.

For multi-TRP/panel or multi-beam or multi-frequency band transmissions, a channel resource m for which various CSI quantities are evaluated by the UE, may itself act as an interference resource with respect to one or more channel resources different from resource m. This means the UE may be configured to assume for interference measurements that the one or more channel resources different to resource m are interference resources. An explicit indication of a channel resource that may act as interference to another channel resource as an interference resource may be required in some contexts. For example, it may be necessary in FR2 scenarios, where spatially selective beams are required for communication. When beamforming is used for reception, the interference measurement resource should be measured with the same Rx beam as the channel resource, such that when a beam suitable for a certain channel resource is used, the interference caused by other resources can be measured. When only the channel measurement resources are given, the UE measures each resource with the respective beam for the channel measurement resource. Hence, the interference resource $r_i$ for a channel resource $r_c$, which may also be another channel resource, may not be received with the beam corresponding to resource $r_c$ to measure the interference corresponding to channel resource $r_c$. Therefore, the explicit configuration of the corresponding interference resource(s) may help in the transmission of the same resources at different instances, thereby helping the UE to switch beams, or in general, modify the settings for measurement between channel and interference measurement of the same resource.

In accordance with an embodiment, the UE is configured to use for interference measurement, one or more of the CSI resource(s), or one or more of the set(s) or group(s) of resource(s) that are configured for channel measurement. This may mean, for example, the UE is provided, by the network node, with a CSI report configuration wherein one or more of the CSI resource(s), or one or more of the set(s) or group(s) of resource(s) that are configured for channel measurement may also be configured for interference measurement. In another example, the UE may be provided to use one or more of the CSI resource(s), or one or more of the set(s) or group(s) of resource(s) that are configured for channel measurement, for interference measurement via instruction from the specification. The ordering or identifier(s) of the resource(s) for channel measurement may be identical or different to the ordering or identifier(s) of the resource(s) for interference measurement, i.e., the same resource may be the $r_i$-th resource in the resource(s) configured for channel measurement and it may be the $r_j$-th resource in the resource(s) configured for interference measurement, wherein $r_i \neq r_j$. In one alternative, for the x-th channel measurement resource, the interference may be measured from the x-th interference measurement resource. In another alternative, for an x-th channel measurement resource, the interference may be measured from one or more resources different to the x-th interference measurement resource.

An example for a multi-TRP scenario may be as follows. A CSI report configuration may provide two resources $\{r_1, r_2\}$ using a CSI resource setting that are configured for channel measurement. For interference measurement, the associated CSI resource setting provides the same resources in one of the following orderings: $I_1 = \{r_1, r_2\}$ or $I_2 = \{r_2, r_1\}$.

If the first ordering $I_1$ is used for interference measurement, then for the first channel measurement resource $r_1$, interference is measured from the second interference measurement resource $r_2$ and for the second channel measurement resource $r_2$, the interference is measured from the first interference measurement resource $r_1$.

If the second ordering $I_2$ is used for the interference measurement, then for the first channel measurement resource $r_1$, the interference is measured from the first interference measurement resource $r_2$ and for the second channel measurement resource $r_2$, the interference is measured from the second interference measurement resource $r_1$.

While a channel resource may be measured as an interference resource for a different channel resource, some of the settings associated with the resource may change when measured as an interference resource. The following embodiment provides some of the settings that might change.

In accordance with some embodiments, one or more of the CSI resource(s), or one or more of the set(s) or group(s) of resource(s) that are provided for channel measurement by the CSI report configuration may also be provided for interference measurement via the same CSI resource setting or a different CSI resource setting. The value of one or more of the following parameters associated with the CSI resource setting or the resource(s) associated with the resource setting used for the interference measurement may be different from the value of the corresponding parameters associated with the CSI resource setting or the resource(s) associated with the resource setting for channel measurements:

The ordering of the resources, or, the identifier (ID) used for one or more resource(s) in the resource setting The aperiodic triggering offset of the resource set(s) in case the CSI resource setting provides aperiodic resource(s)

The time-domain behavior or periodicity (aperiodic, semi-persistent or aperiodic) of the resource(s) provided in the resource setting The periodicity and offset of one or more resource(s)

QCL settings or assumptions for one or more resource(s)

The above statement may mean one of the following:

the CSI resource setting for channel measurement and interference measurement provided by the gNB may be different and/or the configuration of one or more of the said parameters may be different. In this case, the gNB may provide such a configuration or the UE may expect such a configuration.

the settings corresponding to one or more of the said parameters applied by the UE to the resource(s) corresponding to channel measurements and interference measurements may be different.

The difference in the parameters in the two resource settings may be used to adapt the transmission of the resources according to the UE's ability to switch beams or modify measurement parameters (such as QCL assumptions to apply) so that a resource may be measured as a channel resource during one transmission occasion and an interference resource in another occasion.

Spatial Reception Conditions

In frequency range 2 (FR2), i.e., for carrier frequencies greater than 6 GHz, the DL transmissions are received using spatially selective Rx beams at the UE. When a particular beam is used for the reception and measurement of a resource for channel measurement, the same beam should be used for the reception and measurement of the interference measurement resource(s) that is/are associated with the channel measurement resource. When the UE has identified a suitable Rx beam for the reception of a channel measurement resource, the interference conditions when receiving the resource with said beam have to be determined. Therefore, the interference resources are measured with the same Rx beam as the one used for the channel measurement.

In accordance with an embodiment, the UE is configured to apply the 'QCL-typeD' quasi-colocation assumption with respect to a channel measurement resource to measure the interference measurement resource(s) associated with the channel measurement resource, if applicable. Hence, for a given Rx beam of the UE, the channel and interference may be uniquely measured. This means at least one of the following:

- The UE uses the same spatial domain Rx filter for the reception and/or measurement of the channel measurement resource and the associated interference measurement resource(s).
- The UE derives the spatial domain Rx filter for the reception and/or measurement of the channel measurement resource and the associated interference measurement resource(s) from the DL RS provided with 'QCL-typeD' for the channel measurement resource provided by the network, or from the DL RS used by the UE to derive the spatial domain Rx filter for the channel measurement resource.
- The UE expects that the channel measurement resource and the associated interference measurement resource(s) are configured with the same DL RS for 'QCL-typeD' by the network node.
- The reference signals associated with the channel measurement resource and the associated interference measurement resource(s) are transmitted using the same spatial domain transmission filter.

When CSI with respect to multiple CSI resources is provided by the UE in a multi-TRP scenario, for a resource m from a specific TRP used for channel measurement, the resources other than resource m associated with other TRPs that are configured for channel measurement can act as sources of interference. The UE may either be instructed to consider the channel measurement resource(s) different to the resource m as interference measurement resource(s), or the interference measurement resource(s) for each channel measurement resource, even though they may be configured as a part of the channel measurement resources, are explicitly provided to the UE.

Indication of Selected CSI-RS Resources in the Csi Report

In accordance with an embodiment, the CSI report contains a CSI-RS resource indicator (CRI) or a CRI field indicating the selected CSI-RS resource(s) associated with the CSI report.

According to an embodiment, the CRI or CRI field comprises M components or parts for the M selected CSI-RS resources the CSI quantities are associated with in the CSI report. Each component or part of the CRI indicates one of the M selected CSI-RS resources.

According to an embodiment, the CRI or CRI field in the CSI report is associated with a number of code-points, wherein each code-point is associated with a combination or a subset of the CSI-RS resources which are configured for channel measurement in the CSI report configuration. The association of the code-points to combinations of CSI-RS resources may be configured either via higher layer (e.g., RRC or MAC-CE) or it is a priori known to the UE and fixed in specification. In some examples, the association of the code-points to combinations of CSI-RS resources is a higher layer configuration that is contained in the CSI report configuration. If the number of codepoints is X, then the CRI field has a size of $\lceil \log_2 X \rceil$ bits.

In some examples, the UE is configured with three CSI-RS resources for channel measurement—CSI-RS resource #1, CSI-RS resource #2 and CSI-RS resource #3. There are seven possible combinations of CSI-RS resources: (resource 1), (resource 2), (resource 3), (resource 1, resource 2), (resource 1, resource 3), (resource 2, resource 3), and (resource 1, resource 2, resource 3).

In one example, the seven possible combinations are associated with seven codepoints and the CRI or CRI field is represented by a 3-bit indicator as shown in Table 2 below.

TABLE 2

Example of a 3-bit CRI and the association of code-points to CSI-RS resource combinations.

| Code-point | CSI-RS resource combination |
| --- | --- |
| '000' | (resource 1) |
| '001' | (resource 2) |
| '010' | (resource 3) |
| '011' | (resource 1, resource 2) |
| '100' | (resource 1, resource 3) |
| '101' | (resource 2, resource 3) |
| '110' | (resource 1, resource 2, resource 3) |
| '111' | Reserved |

In another example, the codepoints of the CRI are configured via a higher layer and correspond to a subset of four combinations of three CSI-RS resources configured for channel measurement in the CSI report configuration. Table 3 shows an example of a 2-bit-sized CRI indicator that is associated with the four code-points.

TABLE 3

Example of a 2-bit CRI and the association of code-points to CSI-RS resource combinations.

| Code-point | CSI-RS resource combination |
| --- | --- |
| '00' | (resource 1) |
| '01' | (resource 2) |
| '10' | (resource 1, resource 2) |
| '11' | (resource 1, resource 2, resource 3) |

In another example, the UE is configured with two CSI-RS resources for channel measurement. The three possible combinations are associated with three codepoints and the CRI or CRI field is represented by a 2-bit indicator as shown in Table 4 below.

TABLE 4

Example of a 2-bit CRI and the association of code-points to CSI-RS resource combinations.

| Code-point | CSI-RS resource combination |
| --- | --- |
| '00' | (resource 1) |
| '01' | (resource 2) |
| '10' | (resource 1, resource 2) |
| '11' | Reserved |

In another example, the code-points of the CRI field correspond to all possible combinations of CSI-RS resources configured for channel measurement in the CSI report configuration. The association of code-points to combinations or subsets of CSI-RS resources may be higher layer configured or fixed in specification. In some examples, the UE is configured with two CSI-RS resources for channel measurement and there are three possible combinations of CSI-RS resources: (resource 1), (resource 2), and (resource 1, resource 2). Each codepoint of the CRI corresponds to one combination of CSI-RS resources.

If the number of possible combinations is X, then the CRI field has a size of $\lceil \log_2 X \rceil$ bits.

In some examples, the CRI indicating the selected CSI-RS resources the CSI quantity/quantities is/are associated with is included in part 1 of the CSI report. In such a case, the number of indicated CSI-RS resources by the CRI defines the payload size(s) of the remaining part(s) of the CSI report.

In an embodiment, the CSI report comprises two parts—part 1 and part 2, and there exists a first CRI and a second CRI wherein the first CRI is included in part 1 and indicates a single selected CSI-RS resource. In this embodiment, part 1 may contain one or more CSI quantities with respect to the single CSI-RS resource indicated by the first CRI. The second CRI is contained in the remaining part(s) of the CSI report and indicates the remaining CSI-RS resources. The CSI quantity/quantities contained in the remaining part(s) of the CSI report is/are associated with the CSI-RS resource(s) indicated by the second CRI. The second CRI indicates one or more CSI-RS resources wherein the CSI-RS resources are different to the CSI-RS resource indicated by the first CRI.

In an embodiment, a bitmap of size N×1 is included or provided in the CSI report that indicates M CSI-RS resources wherein the M CSI-RS resources are associated with the CSI quantities in the CSI report, and N represents the number of CSI-RS resources configured for channel measurement in the CSI report configuration. Each bit in the bitmap is associated with a CSI-RS resource configured for channel measurement. The CSI report comprises CSI (i.e., the one or more CSI quantities) with respect to M or up to M CSI-RS resources wherein the value of M is either freely selected by the UE, configured via higher layer, or it is fixed in specification. According to an embodiment, the bitmap may comprise M '1's or up to M '1's and the remaining bits are '0'. A '1' in the bitmap or bit-sequence may indicate that the associated CSI-RS resource is selected by the UE and the CSI in the CSI report is associated with the selected CSI-RS resource. The bitmap may be a new field in the CSI report, or the CRI may be provided as said bitmap.

In an embodiment, a bitmap is included or provided in the CSI report that indicates one or more subsets of resources or resource pairs or resource combinations, wherein the resource(s) of the subset(s) or of the resource combinations are configured for channel measurement and each bit in the bitmap is associated with one subset of resources or one resource combination. Moreover, the CSI report comprises CSI quantities associated with the one or more subsets of resources or resource combinations indicated by the bitmap. In some examples, the bitmap is indicated in part 1 of the CSI report.

In an embodiment, the code-points of the CRI correspond to all possible combinations of CSI-RS resources configured for channel measurement in the CSI report configuration. According to an embodiment, the CRI or CRI field is represented by an $$\left\lceil \log_2 \binom{N}{M} \right\rceil \text{ or } \left\lceil \log_2 \left( \sum_{m=1}^{M} \binom{N}{m} \right) \right\rceil \text{ or } \left\lceil \log_2 \left( \sum_{m=0}^{M} \binom{N}{m} \right) \right\rceil$$

bit indicator wherein each code-point of the bit indicator is associated with a combination of m or M CSI-RS resources. In some examples, the UE provides the value M in the CSI report. The value of M is either freely selected by the UE, configured via higher layer by the network node, or it is fixed in specification. In some examples, the CRI indicating the selected CSI-RS resources the CSI is associated with is included in part 2 of the CSI report.

In accordance with an embodiment, the CSI quantities provided in the CSI report are associated with M CSI resources and the CSI report comprises P parts, wherein part 1 of the CSI report may comprise a CRI that indicates 1≤Q≤M CSI resources. If all M resources are indicated in the first part, i.e., Q=M, the parts, p=2, . . . , P of the CSI report do not comprise a CRI. If Q=M=1, the CSI report comprises only a single part.

Indication of CSI-RS Resource Combinations in Csi Report Configuration

In accordance with an embodiment, the UE is configured to receive from a network node an indication (e.g. a CSI resource indication) of one or multiple subsets or combinations of the N resources provided for channel measurement in the CSI report configuration.

The reason for the CSI resource indication or indicator is to reduce UE complexity for the CSI calculation. Without the CSI resource indication, the UE may freely select M resources out of N configured resources in the CSI report configuration which requires the UE to calculate the CSI (i.e. the CSI quantities) for $$\left\lceil \log_2 \binom{N}{M} \right\rceil$$

resource combinations. Depending on the value of N and M, the number of resource combinations and the corresponding UE complexity for the CSI calculation can be very large. In order to reduce the UE complexity, the network node may indicate a reduced set of resource combinations for the CSI calculations to the UE. The UE may perform, for the indicated reduced set of resource combinations, channel and/or interference measurements on received reference signals and the evaluation of the corresponding CSI quantities. Also, from the network perspective, the number of possible resource combinations may be strongly limited, e.g., due to scheduling constraints by the gNB (or network node).

According to an exemplary embodiment, the CSI report configuration comprises a CSI resource indicator, wherein the indicator provides an indication of one or multiple subsets or combinations of resources. In some examples, each subset or combination of resources indicated by the CSI resource indicator is associated with a codepoint of the CRI, as described above, wherein the CRI is provided in the CSI report. In some examples, the indicator indicates two groups of resources, wherein each group comprises one or more resources configured for channel measurement. In one instance, each resource in a subset of the resource(s) in a group is mapped to one CRI codepoint as described above, and one or more resource combinations from the two groups is/are mapped to one or more CRI codepoints, wherein each resource combination comprises a resource pair. Here, a resource pair contains one resource from each group. For example, the first group may comprise (resource 0) and (resource 1) and the second group may comprise (resource 2) and (resource 3) and the mapping of resources to CRI codepoints is as follows and the mapping is either higher-layer configured or known by the UE (i.e., it is fixed in the NR specifications): (resource 0) is mapped to a first CRI codepoint, (resource 2) is mapped to a second CRI codepoint, and resource pair {(resource 1), (resource 3)} is mapped to a third CRI codepoint. Note that each CRI codepoint is associated with a subset of resources configured for channel measurement and a measurement hypothesis.

In some examples, the measurement hypotheses associated with a single resource can be enabled/disabled via higher layer (e.g., RRC). In some examples, the measurement hypotheses associated with a resource pair can be enabled/disabled via higher layer (e.g., RRC).

In some examples, there is a one-one mapping between a resource and a measurement hypothesis. This means, each resource is only associated with one measurement hypothesis.

For example, assume that each resource for channel measurement provided in the CSI report configuration is associated with a TRP, and a resource combination may refer to a combination of TRPs that may be used for joint downlink data transmission to the UE. Due to scheduling constraints by the gNB, only few TRP combinations may be supported for joint transmission to the UE. In an example, the UE is configured with three resources—resource #1, resource #2 and resource #3 wherein the three resources are associated with three different TRPs. The network may support transmissions for TRP1, TRP2 and TRP3 and joint transmissions for TRP pairs (TRP 1, TRP2), (TRP1, TRP3) and (TRP2 and TRP3), but not for TRP pair (TRP 1, TRP2, TRP3). Hence, the network node may indicate via the CSI resource indicator the following resource combinations to the UE: (resource 1), (resource 2), (resource 3), (resource 1, resource 2), (resource 1, resource 3), and (resource 2, resource 3).

For the selection and reporting of the resource combination by the UE, two different embodiments are proposed in the following. In an embodiment, the UE is configured to select a single resource combination out of the indicated set of resource combinations with respect to a specific performance measure (for e.g., mutual information, capacity, throughput, or signal to interference noise ratio, SINR) and to indicate the selected resource combination in the CSI report. The CSI in the CSI report is associated with the indicated resource combination. The selected resource combination may be indicated via the CRI in the CSI report as described above. In another embodiment, the UE is configured to select multiple resource combinations out of the indicated set of resource combinations with respect to a specific performance measure and to indicate the selected resource combinations in the CSI report. The CSI in the CSI report may comprise multiple parts, wherein each CSI part is associated with one indicated resource combination. The selected resource combinations may also be indicated via multiple CRIs in the CSI report.

In some examples, the UE is configured to report multiple CRIs in the CSI report, wherein each CRI is associated with a selected resource or resource combination. The resource or resources within a resource configuration are configured for channel measurement. Moreover, the CSI report may comprise one or more CSI quantities (e.g., contained in CSI part 2), wherein each CSI quantity is associated with a CRI. In some examples, when the UE is configured to report X+1 CRIs, the UE selects X CRIs that are associated with X resource pairs or resource combinations, wherein each resource pair or combination comprises only a single resource that is configured for channel measurement, and 1 CRI that is associated with a resource pair comprising at least two resources configured for channel measurement.

Indication of Selected RI Value(s) in the CSI Report

In accordance with an embodiment, the CSI report contains one or more rank indicator (RI) value(s), each indicating one rank value or a combination of rank values for the selected CSI-RS resources associated with the CSI (i.e., the one or more CSI quantities) in the CSI report.

In some examples, the CSI report comprises two parts—part 1 (the first part) and a second part (part 2), and the RI indicating the selected rank value(s) for the CSI-RS resources associated with the CSI is included in part 1 of the CSI report. In some examples, the CSI report comprises two parts—part 1 and part 2—, and the RI indicator indicating the selected rank value(s) for the CSI-RS resources associated with the CSI is included in part 2 of the CSI report.

In an embodiment, the RI comprises M components for M selected CSI resources the CSI quantities are associated with in the CSI report. Each component of the RI indicates the rank value corresponding to one of the M selected CSI resources.

In an embodiment, the CSI report comprises said two parts wherein part 1 contains CSI that is associated with a single selected CSI-RS resource. In addition, the RI is segmented into two parts wherein the first part of the RI is contained in part 1 of the CSI report and indicates the rank value for the CSI that is contained in part 1 of the CSI report. The second part of the RI indicates the rank value(s) for the CSI that is contained in part 2 of the CSI report.

In an embodiment, the RI includes code-points, and each code-point of the RI indicates a combination of rank values for the selected CSI-RS resources. The bit-size of the RI may depend on the number of selected CSI-RS resources the CSI is associated with in the CSI report, or it is fixed in specification.

In some examples, the UE selects two CSI-RS resources, and it reports a 3-bit RI in the CSI report to indicate two selected rank values for the two CSI-RS resources. The association of the codepoints of the RI to rank values may be either configured to the UE, or it is known by the UE and fixed in specification. Table 4 shows an example of a 3-bit RI for two CSI-RS resources.

TABLE 4

Example of a 3-bit RI and the association of code-points to rank values.

| Code-point | Rank value(s) |
| --- | --- |
| '000' | (1, 1) |
| '001' | (1, 2) |
| '010' | (2, 1) |
| '011' | (2, 2) |
| '100' | (1, 3) |
| '101' | (3, 1) |
| '110' | Reserved |
| '111' | Reserved |

Overall Rank Restriction

In accordance with an embodiment, the UE is configured to receive a higher layer parameter from the network node that indicates a rank restriction of the value obtained by the summation of all rank values contained in the CSI report. This means, the UE is configured to select the rank value(s) in the CSI report such that the overall rank or sum of all rank values is less or equal than $r_i$. Here, $r_i$ is either a higher layer parameter or fixed in the specification. For example, when $r_i=2$ and the number of CSI-RS resources the CSI (i.e., the one or more CSI quantities) in the CSI report is associated with is given by two, the combinations of rank values for the two resources are given by (rank1, rank2)=(1,0), (rank 1, rank 2)=(0,1), (rank1, rank 2)=(1,1), (rank 1, rank 2)=(2,0), and (rank 1, rank 2)=(0,2), wherein rank 1 and rank 2 denote the rank value associated with a first CSI-RS resource and a second CSI-RS resource, respectively.

It should be noted that the above presented embodiments using CSI-RS resources and the corresponding indicator—

CSI-RS resource indicator (CRI) are also applicable using SSB resources and its corresponding indicator—SSB resource indicator, SSBRI.

Figure 4:
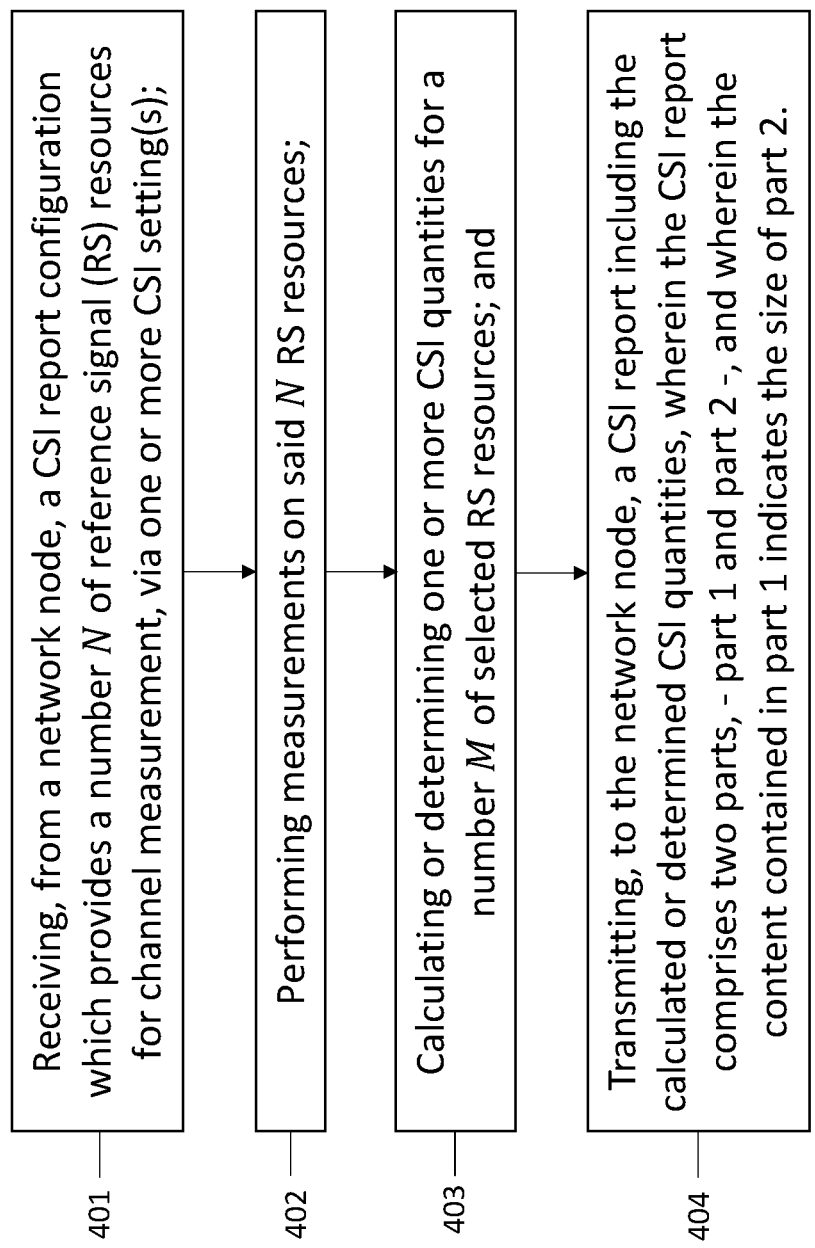
FIG. 4 illustrates a flowchart of a method performed by a UE according to some embodiments

Referring to FIG. 4, there is provided a method performed by a UE, summarizing some of the embodiments previously described: As shown, the method comprises:

(401) receiving, from a network node, a CSI report configuration which provides a number N of reference signal (RS) resources for channel measurement, via one or more CSI setting(s);

(402) performing measurements on said N RS resources;

(403) calculating or determining one or more CSI quantities for a number M of selected RS resources; and (404) transmitting, to the network node, a CSI report including the calculated or determined CSI quantities, wherein the CSI report comprises two parts—part 1 and part 2, and wherein the content contained in part 1 indicates the size of part 2.

As previously described, the CSI report may comprise a number P of parts wherein the first part of said P parts has a fixed payload size; and wherein P may be smaller or equal to M.

The payload size(s) of additional part(s) p of the CSI report may be indicated or determined by a content of a part q, wherein $1 < p \leq P$ and $1 \leq q < p$. Different examples of the number of parts have already been presented. The list of the CSI quantities has been presented.

As previously described, according to an embodiment, the reference signal resources are CSI-RS resources or SSB resources, or a mixture of CSI-RS resources and SSB resources.

The method further comprises, measuring the channel using one or more of said reference signals, and measuring the corresponding interference using said one or more resources from at least one of the following:

a CSI-interference management, IM, resource, one or more Non Zero Power, (NZP) CSI-RS or SSB resources, or one or more NZP CSI-RS or SSB resources that are configured for interference measurement.

The CSI report configuration is linked to one or more CSI resource settings, and the CSI report configuration provides at least one of the following settings:

One or more CSI resource settings, each providing one or more set(s) of downlink RS resource(s) for channel measurement, One or more CSI resource settings, each providing one or more set(s) of CSI-IM resource(s) for interference measurement, One or more CSI resource settings, each providing one or more set(s) of DL RS resource(s) for interference measurement.

As previously presented, the number of CSI resource settings for channel measurements and/or the number of CSI resource settings for interference measurement from CSI-IM resources and/or the number of CSI resource settings for interference measurement from CSI-RS or SSB resources is equal to a number of frequency bands or a number of TRPs or beams, the resources are associated with. The method performed by the UE further comprises using for interference measurement one or more resource(s) or one or more group(s) or set(s) of CSI resource(s) that are configured for channel measurement.

The CSI report contains a CRI or a CRI field indicating selected CSI-RS resource(s) associated with the CSI report. The CRI or the CRI field is associated with a number of code-points, wherein each code-point is associated with a combination or a subset of the CSI-RS resources which are configured for channel measurement in the CSI report configuration.

According to an exemplary an embodiment, the CSI report may include a bitmap of size N×1 that indicates M CSI-RS resources wherein the M CSI-RS resources are associated with the CSI quantities in the CSI report. The bitmap comprises M '1's or up to M '1's and the remaining bits are '0', and wherein a '1' in the bitmap may indicate that the associated CSI-RS resource is selected by the UE and the CSI in the CSI report is associated with the selected CSI-RS resource.

In another exemplary embodiment, a bitmap is included or provided in the CSI report that indicates one or multiple subsets or resource combinations, wherein the resource(s) of the subset(s) or of the resource combinations are configured for channel measurement and each bit in the bitmap is associated with one subset or one resource combination. Moreover, the CSI report comprises CSI quantities associated with the one or more subsets or resource combinations indicated by the bitmap. In some examples, the bitmap is indicated in part 1 of the CSI report. In some examples, the CRI in the CSI report is represented by the bitmap.

According to an embodiment, the CRI or the CRI field is represented by an $$\left\lceil \log_2 \binom{N}{M} \right\rceil \text{ or } \left\lceil \log_2 \left( \sum_{m=1}^{M} \binom{N}{m} \right) \right\rceil \text{ or } \left\lceil \log_2 \left( \sum_{m=0}^{M} \binom{N}{m} \right) \right\rceil$$

bit indicator wherein each code-point of the bit indicator is associated with a combination of m or M CSI-RS resources.

The CSI report configuration comprises a CSI resource indicator that indicates one or multiple subsets or combinations of the N resources provided in the CSI report configuration. The subset(s) or combination(s) of resources associated with a code-point of the CSI-RS resource indicator, CRI, is either configured via a higher layer or fixed in the specification.

According to an embodiment, the CSI report contains a rank indicator (RI) indicating a combination of rank values for selected CSI-RS resources associated with the CSI report. The RI is included in the first part, part 1, of the CSI report or in a another part of the CSI report, e.g. in second part, part 2, of the CSI report, or in a third part, or in fourth part etc.

According to an embodiment, the method comprises selecting a number of CSI resources and reporting a bit-size RI in the CSR report to indicated at least a number of selected RI values for the number of CSI-RS resources. For example, selecting two CSI-RS resources, and reporting a 3-bit RI in the CSI report to indicate two selected RI values for the two CSI-RS resources. It should be mentioned that the number of CSI reported and the number of bits of the RI are design parameters.

According to an embodiment, the method may further comprise receiving from the network node a higher layer parameter that indicates a rank restriction of a value obtained by a summation of said RI values, as described previously in subsection "overall rank restriction".

Additional actions performed by the UE have already been described.

Figure 5:
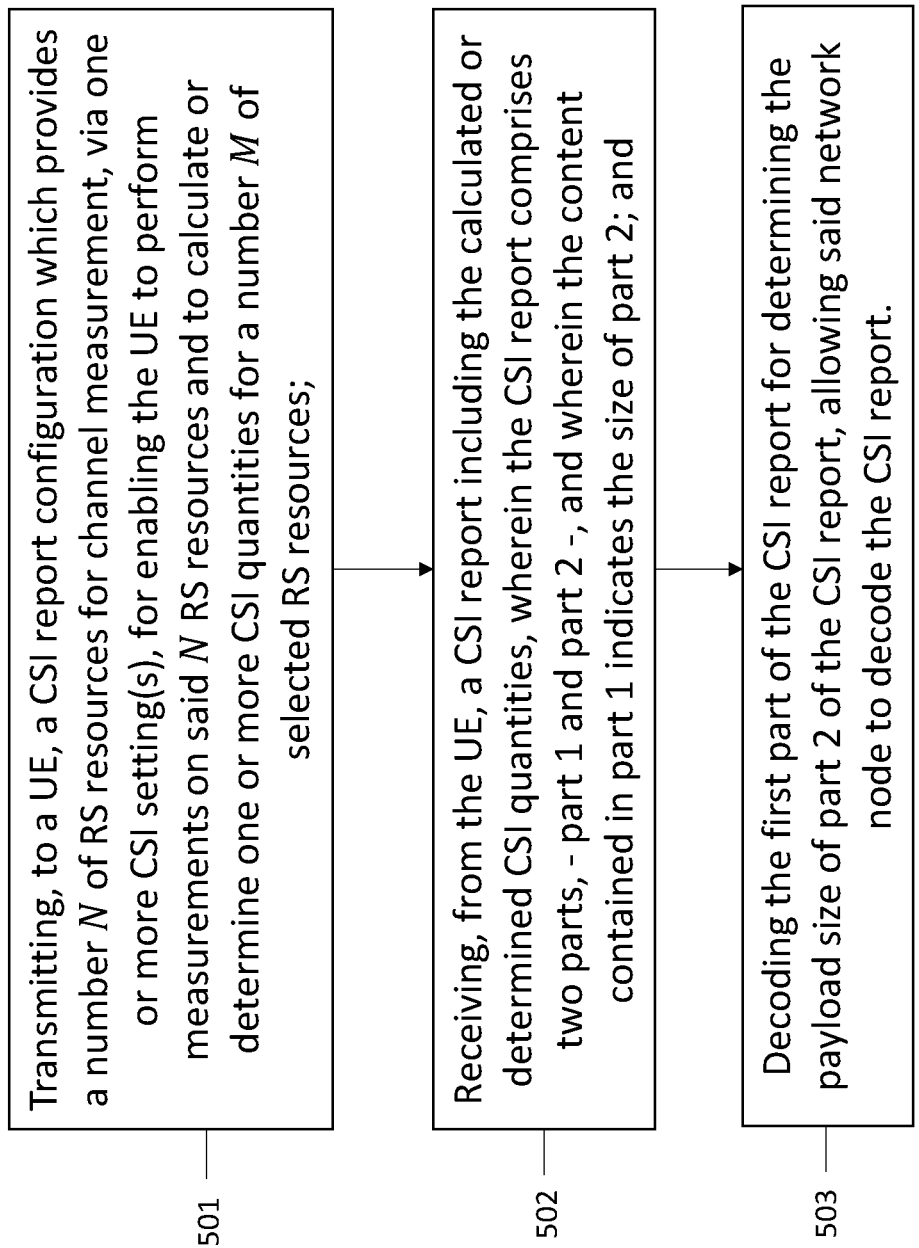
FIG. 5 illustrates a flowchart of a method performed by a network node according to some embodiments

Referring to FIG. 5, there is provided a method performed by a network node or gNB according to some embodiments previously described: As shown, the method comprises:

(501) transmitting, to a UE, a CSI report configuration which provides a number N of RS resources for channel measurement, via one or more CSI setting(s). This enables the UE to perform measurements on said N RS resources and calculate or determine one or more CSI quantities for a number M of selected RS resources;

(502) receiving, from the UE, a CSI report including the calculated or determined CSI quantities, wherein the CSI report comprises two parts, —part 1 and part 2, and wherein the content contained in part 1 indicates the size or payload size of part 2; and (503) decoding the first part (i.e. part 1) of the CSI report for determining the payload size of the subsequent part (i.e. part 2) of the CSI report, allowing said network node to decode the CSI report.

Additional actions performed by the network node have already been described.

Figure 6:
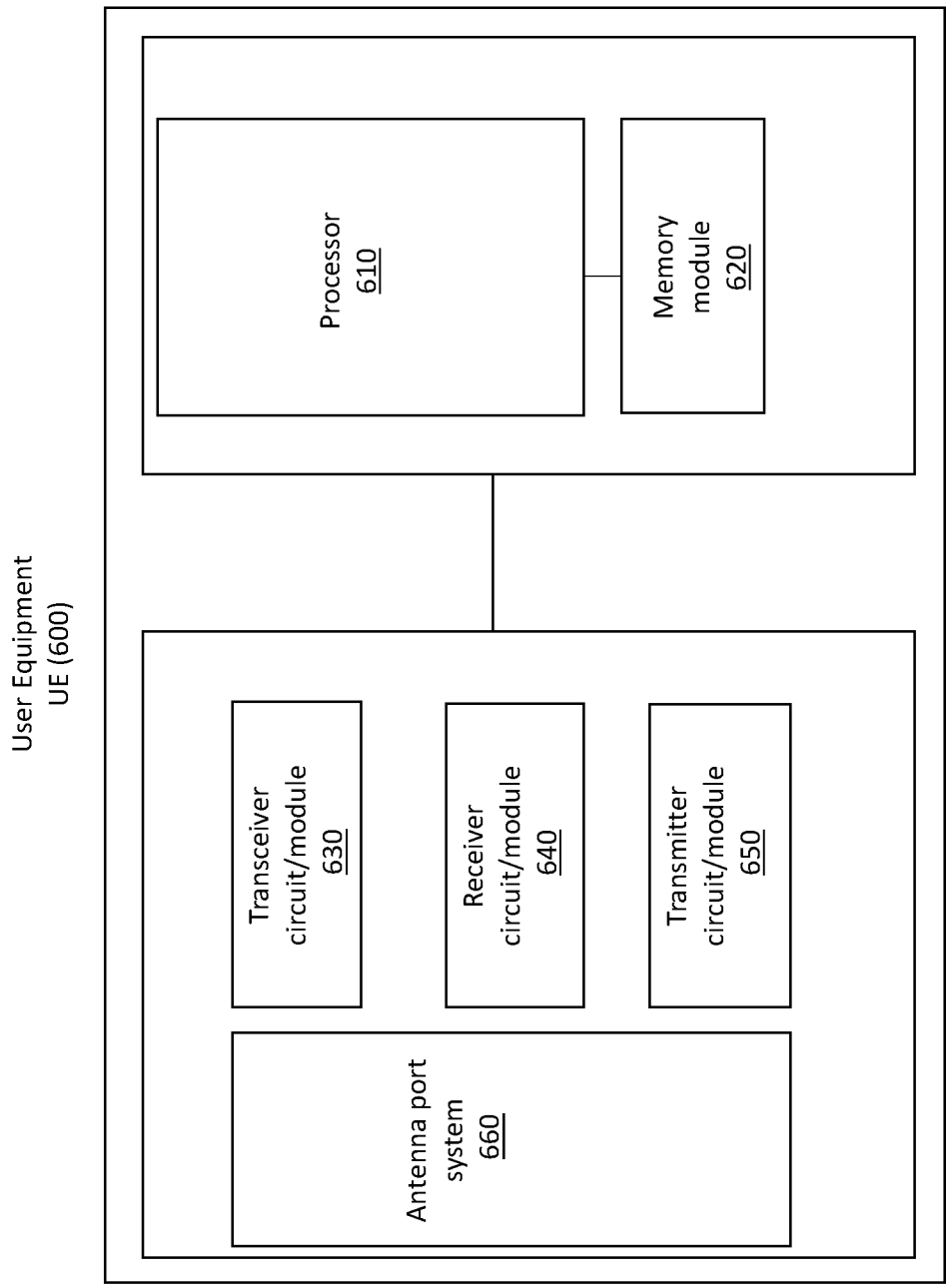
FIG. 6 illustrates a block diagram depicting a UE according to some embodiments herein.

In order to perform the previously described process or method steps performed by the UE there is also provided a UE. FIG. 6 illustrates a block diagram depicting a UE 600. The UE 600 comprises a processor 610 or processing circuit or a processing module or a processor or means 610; a receiver circuit or receiver module 640; a transmitter circuit or transmitter module 650; a memory module 620, a transceiver circuit or transceiver module 630 which may include the transmitter circuit 650 and the receiver circuit 640. The UE 600 further comprises an antenna system 660 which includes antenna circuitry for transmitting and receiving signals to/from at least the network node. The antenna system 660 employs beamforming as previously described. The actions performed by the UE 600 have already been described.

The UE 600 may belong to any radio access technology including 4G or LTE, LTE-A, 5G, advanced 5G or a combination thereof that support beamforming technology. The UE comprising the processor and the memory contains instructions executable by the processor, whereby the UE 600 is operative or is configured to perform any one of the embodiments related to the UE previously described.

The processing module/circuit 610 includes a processor, microprocessor, an application specific integrated circuit (ASIC), field programmable gate array (FPGA), or the like, and may be referred to as the "processor." The processor 610 controls the operation of the network node and its components. Memory (circuit or module) 620 includes a random-access memory (RAM), a read only memory (ROM), and/or another type of memory to store data and instructions that may be used by processor 610. In general, it will be understood that the network node in one or more embodiments includes fixed or programmed circuitry that is configured to carry out the operations in any of the embodiments disclosed herein.

In at least one such example, the processor 610 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure relating to the UE. Further, it will be appreciated that the UE 600 may comprise additional components.

Figure 7:
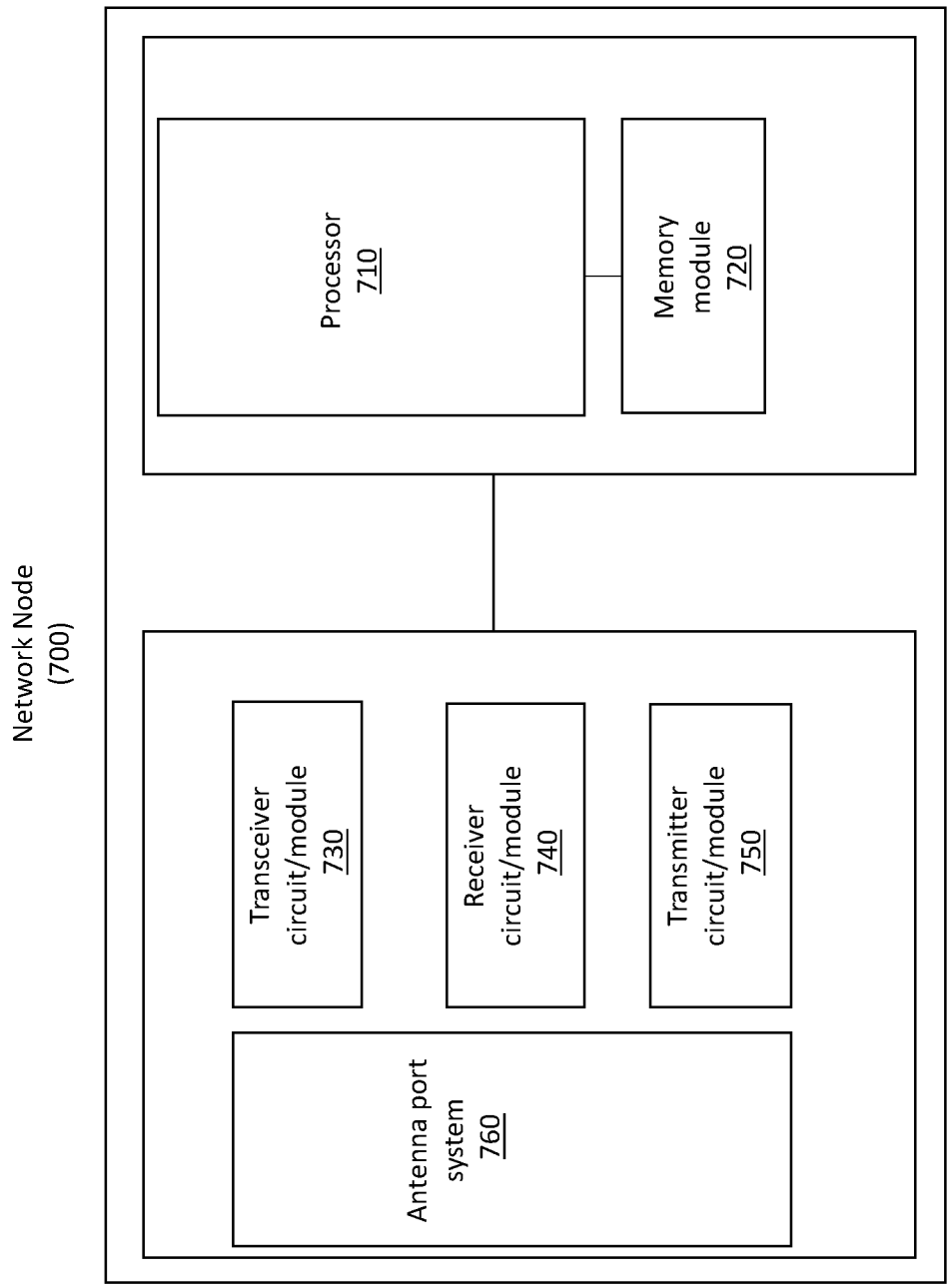
FIG. 7 illustrates a block diagram depicting a network node according to some embodiments herein

In order to perform the previously described process or method steps performed by the network node, there is also provided a network node (or gNB). FIG. 7 illustrates an exemplary block diagram of a network node. The network node 700 comprises a processor 710 or processing circuit or a processing module or a processor or means 710; a receiver circuit or receiver module 740; a transmitter circuit or transmitter module 750; a memory module 720, a transceiver circuit or transceiver module 730 which may include the transmitter circuit 750 and the receiver circuit 740. The network node 700 further comprises an antenna system 760 which includes antenna circuitry for transmitting and receiving signals to/from at least the UE. The antenna system employs beamforming as previously described. The actions performed by the network node 700 have already been described. The network node 700 may also be viewed as a TRP.

The processing module/circuit 710 includes a processor, microprocessor, an application specific integrated circuit (ASIC), field programmable gate array (FPGA), or the like, and may be referred to as the "processor." The processor 710 controls the operation of the network node and its components. Memory (circuit or module) 720 includes a random-access memory (RAM), a read only memory (ROM), and/or another type of memory to store data and instructions that may be used by processor 710. In general, it will be understood that the network node in one or more embodiments includes fixed or programmed circuitry that is configured to carry out the operations in any of the embodiments disclosed herein.

In at least one such example, the processor 710 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node may comprise additional components.

The network node 700 may belong to any radio access technology including 4G or LTE, LTE-A, 5G, advanced 5G or a combination thereof that support beamforming technology. The network node 700 comprising the processor and the memory contains instructions executable by the processor, whereby the network node 700 is operative or is configured to perform any one of the subject-matter disclosed in this disclosure related to the network node (or gNB).

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems

REFERENCES

[1] 3GPP TS 38.211 V16.0.0: "3GPP; TSG RAN; NR; Physical channels and modulation (Rel. 16)," January 2020.
[2] 3GPP TS 38.212 V16.0.0: "3GPP; TSG RAN; NR; Multiplexing and channel coding (Rel. 16)," January 2020.
[3] 3GPP TS 38.213 V16.0.0: "3GPP; TSG RAN; NR; Physical layer procedures for control (Rel. 16)," January 2020.
[4] 3GPP TS 38.214 V16.0.0: "3GPP; TSG RAN; NR; Physical layer procedures for data (Rel. 16)," January 2020.
[5] 3GPP TS 38.321 V15.8.0: "3GPP; TSG RAN; NR; Medium Access Control (MAC) protocol specification (Rel. 15)," January 2020.
[6] 3GPP TS 38.331 V15.8.0: "3GPP; TSG RAN; NR; Radio Resource Control (RRC); Protocol specification (Rel. 15)," January 2020.
[7] 3GPP TS 38.101-1 V16.2.0: "3GPP; TSG RAN; User Equipment (UE) radio transmission and reception; Part 1: Range 1 Standalone (Rel. 16)," January 2020.
[8] 3GPP TS 38.101-2 V16.2.0: "3GPP; TSG RAN; User Equipment (UE) radio transmission and reception; Part 2: Range 2 Standalone (Rel. 16)," January 2020.

The invention claimed is:

1. A method performed by a user equipment (UE), the method comprising:
receiving, from a network node, a channel state information (CSI) report configuration providing:
N Non Zero Power (NZP) CSI reference signal (CSI-RS) or synchronization signal/physical broadcast channel (SSB) resources associated with one or more NZP CSI-RS or SSB resources sets for channel measurement;
one or more resources for interference measurement wherein the resources for interference measurement are CSI interference management (CSI-IM) resources being Zero-Power CSI-RS resources and/or NZP CSI-RS resources or SSB resources; and
an indication of one or multiple subsets or combinations of the N resources provided for channel measurement in the CSI report configuration;
applying a Quasi-CoLocation typeD (QCL) assumption with respect to a channel measurement resource to measure one or more interference measurement resources associated with the channel measurement resource, wherein the QCL-typeD assumption is defined in the 3GPP specifications; and
providing, to the network node, a CSI report that comprises two parts, part 1 and part 2, and wherein the content contained in part 1 indicates the size of part 2, wherein the CSI report contains a CSI-RS resource indicator (CRI) or a CRI field indicating selected CSI-RS resources associated with the CSI report, wherein the CRI or CRI field is included in part 1 of the CSI report, and wherein the CRI or CRI field is associated with a number of code-points, wherein each code-point is associated with a combination or a subset of the CSI-RS resources which are configured for channel measurement in the CSI report configuration; and the association of the code-points to combinations of CSI-RS resources is configured via a higher layer or it is a priori known to the UE and fixed in the 3GPP specifications.

2. The method according to claim 1, wherein the CSI report includes one or more of the following CSI quantities:
a synchronization signal/physical broadcast channel (SSB) resource identifier (SSBRI) indicating a subset or a combination of SSB resources, out of the SSB resources provided in the CSI report configuration, wherein each resource is associated with the one or more CSI quantities in the CSI report;
a rank indicator (RI) indicating a combination of rank values for the subset of CSI-RS resources in the CSI report;
a channel quality indicator (CQI) indicating one or more CQI values for the subset of CSI-RS resources;
a layer indicator (LI) value, and
a precoding matrix indicator (PMI) indicating one or more precoding matrices for the subset of CSI-RS resources.

3. The method according to claim 1, further comprising, measuring the channel using one or more of said reference signals, and measuring the corresponding interference using said one or more resources from at least one of the following:
a CSI-interference management (IM) resource;
one or more Non Zero Power (NZP) CSI-RS or SSB resources; or
one or more NZP CSI-RS or SSB resources that are configured for interference measurement.

4. The method according to claim 1, wherein the CSI report configuration is linked to one or more CSI resource settings, wherein the CSI report configuration provides at least one of the following settings:
one or more CSI resource settings, each providing one or more sets of downlink RS resource(s) for channel measurement;
one or more CSI resource settings, each providing one or more sets of CSI-IM resources for interference measurement; and
one or more CSI resource settings, each providing one or more sets of DL RS resources for interference measurement.

5. The method according to claim 4, wherein the number of CSI resource settings for channel measurements and/or the number of CSI resource settings for interference measurement from CSI-IM resources and/or the number of CSI resource settings for interference measurement from CSI-RS or SSB resources is equal to a number of frequency bands or a number of transmit receive points, TRPs, the resources are associated with.

6. The method according to claim 1, wherein each CSI quantity is associated with at least one of the M selected RS resources, and wherein the M selected RS resources are indicated in the CSI report.

7. The method according to claim 1, wherein the number of indicated CSI-RS resources by the CRI determines the payload size of part 2 of the CSI report.

8. The method according to claim 1, wherein the CSI report includes a bitmap that indicates one or multiple subsets or resource combinations of resources configured for channel measurement and are associated with the CSI quantities in the CSI report.

9. The method according claim 1, wherein, the CRI or the CRI field is represented by an $$\left\lceil \log_2 \binom{N}{M} \right\rceil \text{ or } \left\lceil \log_2 \left( \sum_{m=1}^{M} \binom{N}{m} \right) \right\rceil \text{ or } \left\lceil \log_2 \left( \sum_{m=0}^{M} \binom{N}{m} \right) \right\rceil$$

bit indicator wherein each code-point of the bit indicator is associated with a combination of m or M CSI-RS resources.

10. The method according to claim 1, wherein the CSI report contains a rank indicator (RI) indicating a combination of rank or RI values for selected CSI-RS resources associated with the CSI report, and the RI indicating the selected rank values for the CSI-RS resources associated with the CSI is included in part 1 of the CSI report.

11. The method according to claim 10, further comprising, receiving, from the network node, a higher layer parameter that indicates a rank restriction of a value obtained by a summation of said RI values.

12. The method according to claim 10, wherein the RI or RI field is associated with a number of code-points, and each code-point of the RI or RI field indicates a combination of rank values of the selected CSI-RS resources.

13. A method performed by a network node, the method comprising:
transmitting, to a user equipment (UE) a channel state information (CSI) report configuration which provides:
N Non Zero Power (NZP) CSI reference signal (CSI-RS) or synchronization signal/physical broadcast channel (SSB) resources associated with one or more NZP CSI-RS or SSB resources sets for channel measurement; and
one or more resources for interference measurement wherein the resources for interference measurement are CSI interference management (CSI-IM) resources being Zero-Power CSI-RS resources and/or NZP CSI-RS resources or SSB resources; and
an indication of one or multiple subsets or combinations of the N resources provided for channel measurement in the CSI report configuration;
enabling the UE to apply a Quasi-CoLocation typeD (QCL) assumption with respect to a channel measurement resource to measure one or more interference measurement resources associated with the channel measurement resource, wherein the QCL-typeD assumption is defined in the 3GPP specifications;
receiving, from the UE, a CSI report wherein the CSI report comprises two parts-part 1 and part 2, and wherein the content contained in part 1 indicates the size of part 2; and
decoding part 1 of the CSI report for determining the payload size of part 2 of the CSI report, allowing said network node to decode the CSI report,
wherein the CSI report contains a CSI-RS resource indicator, CRI, or a CRI field included in part 1 of the CSI report, and wherein the CRI or CRI field is associated with a number of code-points, wherein each code-point is associated with a combination or a subset of the CSI-RS resources which are configured for channel measurement in the CSI report configuration; and the association of the code-points to combinations of CSI-RS resources is configured via a higher layer or it is a priori known to the UE and fixed in the 3GPP specifications.

14. A user equipment (UE) comprising a processor and a memory, said memory containing instructions executable by said processor whereby said UE is operative to:
receive, from a network node, a channel state information (CSI) report configuration providing:
N Non Zero Power (NZP) CSI reference signal (CSI-RS) or synchronization signal/physical broadcast channel (SSB) resources associated with one or more NZP CSI-RS or SSB resources sets for channel measurement;
one or more resources for interference measurement wherein the resources for interference measurement are CSI interference management (CSI-IM) resources being Zero-Power CSI-RS resources and/or NZP CSI-RS resources or SSB resources; and
an indication of one or multiple subsets or combinations of the N resources provided for channel measurement in the CSI report configuration;
apply a Quasi-CoLocation typeD (QCL) assumption with respect to a channel measurement resource to measure one or more interference measurement resources associated with the channel measurement resource, wherein the QCL-typeD assumption is defined in the 3GPP specifications; and
provide, to the network node, a CSI report that comprises two parts, part 1 and part 2, and wherein the content contained in part 1 indicates the size of part 2,
wherein the CSI report contains a CSI-RS resource indicator (CRI) or a CRI field indicating selected CSI-RS resources associated with the CSI report, wherein the CRI or CRI field is included in part 1 of the CSI report, and wherein the CRI or CRI field is associated with a number of code-points, wherein each code-point is associated with a combination or a subset of the CSI-RS resources which are configured for channel measurement in the CSI report configuration; and the association of the code-points to combinations of CSI-RS resources is configured via a higher layer or it is a priori known to the UE and fixed in the 3GPP specifications.

15. A network node comprising a processor and a memory, said memory containing instructions executable by said processor whereby said network node is operative to:
transmit, to a user equipment (UE) a channel state information (CSI) report configuration which provides:
N Non Zero Power (NZP) CSI reference signal (CSI-RS) or synchronization signal/physical broadcast channel (SSB) resources associated with one or more NZP CSI-RS or SSB resources sets for channel measurement; and
one or more resources for interference measurement wherein the resources for interference measurement are CSI interference management (CSI-IM) resources being Zero-Power CSI-RS resources and/or NZP CSI-RS resources or SSB resources; and
an indication of one or multiple subsets or combinations of the N resources provided for channel measurement in the CSI report configuration;
enable the UE to apply a Quasi-CoLocation typeD (QCL) assumption with respect to a channel measurement resource to measure one or more interference measurement resources associated with the channel measurement resource, wherein the QCL-typeD assumption is defined in the 3GPP specifications;
receive, from the UE, a CSI report wherein the CSI report comprises two parts-part 1 and part 2, and wherein the content contained in part 1 indicates the size of part 2; and
decode part 1 of the CSI report for determining the payload size of part 2 of the CSI report, allowing said network node to decode the CSI report, wherein the CSI report contains a CSI-RS resource indicator, CRI, or a CRI field included in part 1 of the CSI report, and wherein the CRI or CRI field is associated with a number of code-points, wherein each code-point is associated with a combination or a subset of the CSI-RS resources which are configured for channel measurement in the CSI report configuration; and the association of the code-points to combinations of CSI-RS resources is configured via a higher layer or it is a priori known to the UE and fixed in the 3GPP specifications.

* * * * *